US010187375B1

(12) United States Patent
Kincaid

(10) Patent No.: US 10,187,375 B1
(45) Date of Patent: Jan. 22, 2019

(54) CRYPTOGRAPHIC SERVICES ENGINE

(71) Applicant: WALGREEN CO., Deerfield, IL (US)

(72) Inventor: Kurt Kincaid, Lincolnshire, IL (US)

(73) Assignee: WALGREEN CO., Deerfield, IL (US)

( * ) Notice: Subject to any disclaimer, the term of this patent is extended or adjusted under 35 U.S.C. 154(b) by 107 days.

(21) Appl. No.: 15/171,591

(22) Filed: Jun. 2, 2016

Related U.S. Application Data

(60) Provisional application No. 62/326,300, filed on Apr. 22, 2016.

(51) Int. Cl.
*H04L 29/06* (2006.01)
*H04L 9/32* (2006.01)

(52) U.S. Cl.
CPC ........ *H04L 63/0823* (2013.01); *H04L 9/3268* (2013.01); *H04L 63/062* (2013.01); *H04L 63/0876* (2013.01)

(58) Field of Classification Search
CPC . H04L 63/0823; H04L 9/3268; H04L 63/062; H04L 63/0876
See application file for complete search history.

(56) References Cited

U.S. PATENT DOCUMENTS

| | | | | |
|---|---|---|---|---|
| 2005/0069136 | A1* | 3/2005 | Thornton | H04L 63/0823 380/277 |
| 2006/0129803 | A1* | 6/2006 | Gentry | H04L 9/3236 713/156 |
| 2008/0271134 | A1* | 10/2008 | Johnson | H04L 63/02 726/13 |
| 2014/0298040 | A1* | 10/2014 | Ignatchenko | G06F 21/72 713/192 |
| 2016/0359836 | A1* | 12/2016 | Horgan | H04L 63/083 |

* cited by examiner

*Primary Examiner* — Ghodrat Jamshidi
(74) *Attorney, Agent, or Firm* — Marshall, Gerstein & Borun LLP; Randall G. Rueth

(57) ABSTRACT

A cryptographic services management engine may provide a single point of interaction for both users and administrators to manage and consume cryptographic services. Such an engine may allow centralized control over cryptography parameters, ensuring enterprise security standards are maintained while abstracting the complexity and potential for error away from users. Automating cryptographic maintenance tasks may avoid outages caused by expired or incorrect certificates, and improve reliability and predictability of critical infrastructure services.

17 Claims, 29 Drawing Sheets

1700

*Administrative Notes*

*Timestamp and admin name are included automatically*

[toolbar: File, Edit, Insert, View, Format, Table, Tools]
[toolbar: Formats, B, I, ...]

— 1710

— 1720

| Date | Author | Message |
|---|---|---|
| 2016-04-12 02:13:48 PM | Kurt Kincaid | This is a new note. |
| 2016-04-12 02:13:56 PM | Kurt Kincaid | So is this. |

```
{"_key":"496034982179","managed":true,"publicExponent":"010001","pubKey":
{"name":"RSA","size":"2048"},"skid":"134049a7449f7d8d1ab1963f44fbcc68ae06
odulus":"c14eb28f603c9e567f513e21e43784c9d7dc5e30c4173c2e7a9d521626b3caad
688873f3ceafa0e0bc209c4db8de66d7867b1e8873cf3289a364f4c8f6laa6f55fc49414
0a6d664ab56cf8fba5e3633b1d469fc16da07b0a08ec8ff6412a9c28d4550a7d244d772b9
84349378d6e1b990fb60feb957df3","serial":"11cb6dd40000000227c9","notBefore
CERTIFICATE-----\r\nMIIHeDCCBmCgAwIBAgIKEctt1AAAAInyTANBgkqhkiG9w0BAQUFA
\r\nBgNVBAMTH1dhbGdyZWVucyBJbnRlcm5hbCBJc3N1aW5nIENBBIDIwMhcNMTUwMjAy\r\nM
\r\nCE1sbG1ub21zMRIwEAYDVQQHEwlEZWVyZm11bGQxFTATBgNVBAoTDFdhbGdyZWVucy\r\nI
```

FIG. 18

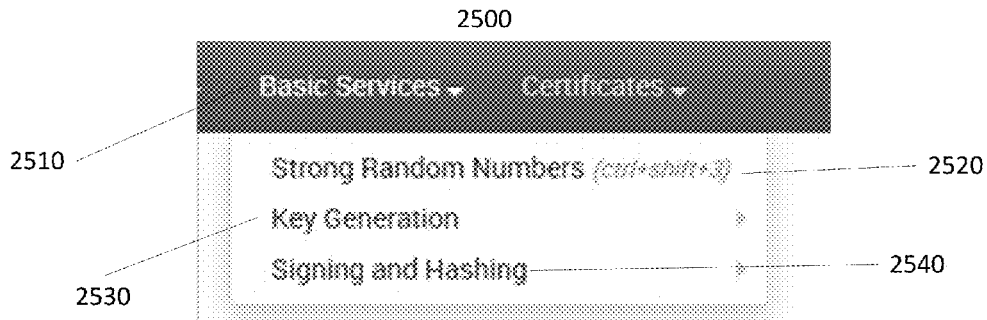
FIG. 25
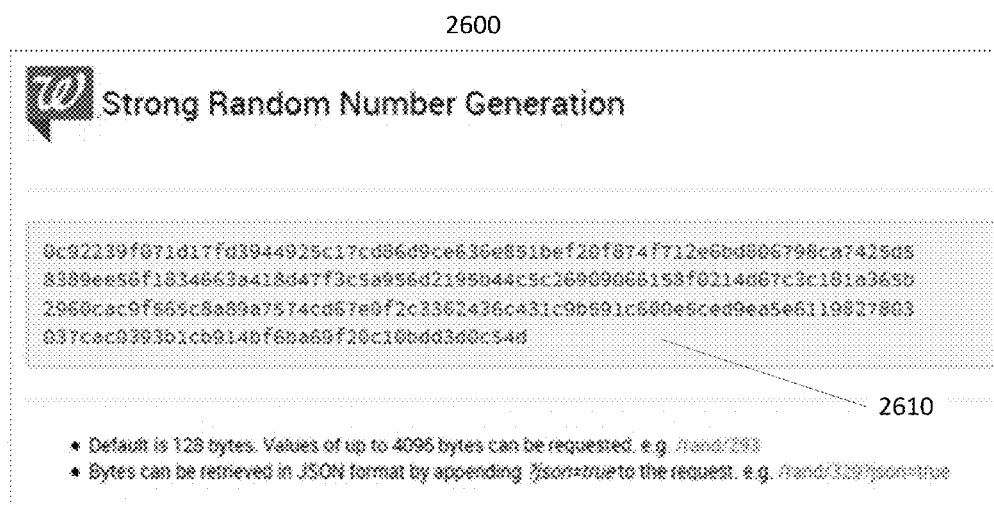
FIG. 26
FIG. 27

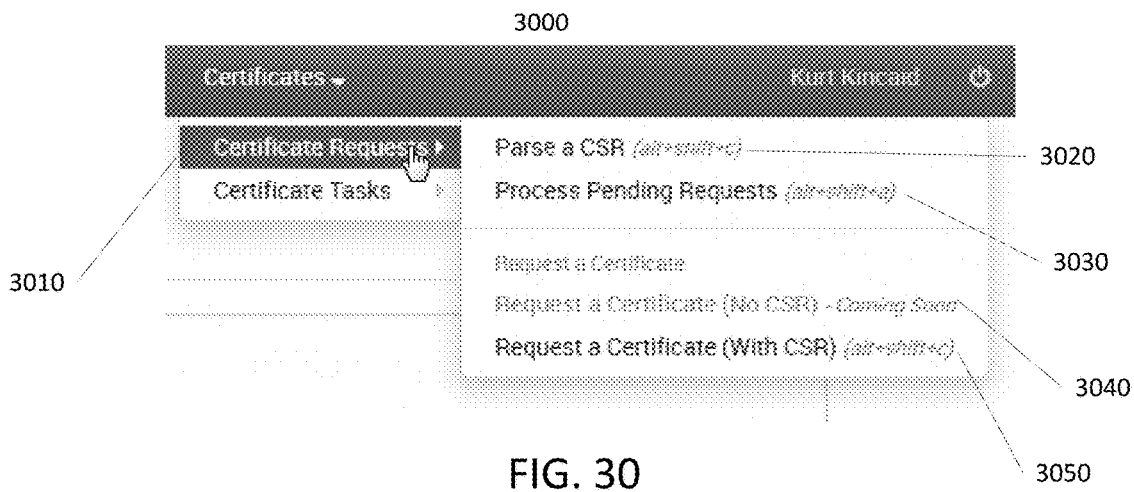
FIG. 30
FIG. 31
FIG. 32

| CSR Content | Subject Alternative Names | Additional Information |

Subject Alternative Name Info

████████████.walgreenco.net

| CSR Content | Subject Alternative Names | Additional Information |

Request Metadata

Subscriber Name
Subscriber Email      @walgreens.com
Authorizer Name       Subscriber's manager
Authorizer Email      @walgreens.com

Certificate Template

Walgreens Client and Server Authentica ▼

[Submit] [Reset]

CRYPTOGRAPHIC SERVICES ENGINE

CROSS-REFERENCE TO RELATED APPLICATIONS

This application claims the benefit of U.S. Provisional Patent Application No. 62/326,300, entitled "Cryptographic Services Engine," filed on Apr. 22, 2016, the disclosure of which is hereby incorporated herein by reference.

FIELD OF THE INVENTION

The disclosure generally relates to systems, methods, apparatus, and non-transitory computer readable media to provide cryptographic services and, more particularly, to improve cryptographic security and integrity across an enterprise.

BACKGROUND

Organizations involved in secure communications, for example, between servers and other servers or client nodes, maintain integrity and confidentiality of data using encryption and signature services between nodes. Such services may include public and private key systems, that include public and private key generation and distribution, signature services, random number generation, authentication, certificate administration, and infrastructure monitoring. To efficiently administer such systems, organizations may implement centralized or distributed services engines that allow controlled access to users, depending on a business need.

Given the particular sensitivity of encryption infrastructure to the continued functioning of businesses, an increased emphasis on security and services availability often drives access to such infrastructure to a limited group within a business, creating bottlenecks and increased costs. However, solutions that segregate responsibility for services availability and security across a widely distributed enterprise may fall victim to a variety of sub-optimal solutions and non-standard processes that slow business process changes, and increase costs of basic maintenance tasks.

SUMMARY

One exemplary embodiment includes a cryptographic services engine, that includes a computer processor, and a network interface that translates a cryptographic services request from a user into a service instruction for the processor, and memory that includes code to perform a cryptographic service and a memory that includes cryptographic data. The computer processor may, in response to the services instruction, to execute the code in the memory to perform the cryptographic service using the cryptographic data.

Another exemplary embodiment includes a non-transitory, tangible computer-readable medium, storing machine readable instructions that when executed by a processor cause the processor to receive a cryptographic service instruction from a network interface, retrieve processor executable code from a first memory, retrieve cryptographic data from a second memory; and execute the processor executable code to perform a cryptographic service, corresponding to the service instruction, on the cryptographic data.

Another embodiment includes a computer implemented method, executed with a computer processor, perform a cryptographic service, including receiving a cryptographic service instruction from a network interface, retrieving processor executable code from a first memory, retrieving cryptographic data from a second memory, and executing code to perform the cryptographic service, corresponding to the service instruction, on the cryptographic data.

Other embodiments include, certificate lifecycle tracking, automated alerts to certificate owner or application owner, automated alerts to certificate admin, integration with arbitrary number of certificate authorities, and direct integration with Active Directory Certificate Services, including multiple certificate authorities.

Still further embodiments include an interface to issue certificates from scratch, an interface to issue certificates from existing CSR, an interface to revoke certificates, reporting with scheduled reports and ad hoc reports, support for separation of duties (i.e. CA administration vs. certificate administration), and certificate database queries across multiple CAs.

Alternative embodiments include revoked certificate querying/viewing, viewing PKI health for environment as a whole, viewing PKI health for a given CA, publishing CRLs/Delta CRLs, detailed audit and logging, strict enforcement of individual user authentication, and integration with Active Directory for user authentication and group/role based access.

Further embodiments include the ability to automate/streamline certificate request and issuance process, the ability to integrate with external logging sources, such as an enterprise SIEM or log collector, the ability to define which alerts get sent to SIEM or log collector, and the ability to define different actions for different types of alerts (i.e. log alert with SIEM, send email to particular user or group, open a ticket with enterprise ticketing system, etc.).

Still further embodiments include validation of requests for key type, key length, duplicate private key, etc., setting specific requirements for contents of certain Subject fields (for example, that all certificates have Walgreen Co. as the organization name), maintaining a database of requester information to correlate between requester and certificate, the ability to define certificate dependencies and relationships, the ability to audit user/administrator activities, providing management for other types of encryption keys, or ability to integrate with external key management solutions, and the ability to add/remove CAs as needed.

BRIEF DESCRIPTION OF THE DRAWINGS

The Figures described below depict various aspects of the system and methods disclosed herein. It should be understood that each figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the Figures arrangements which are presently discussed, it being understood, however, that the present embodiments are not limited to the precise arrangements and instrumentalities shown, wherein:

FIG. 13 illustrates a certificate expiration list, in accordance with one aspect of the present disclosure;

FIGS. 14-17 illustrate various aspects of a certificate details screen, in accordance with one aspect of the present disclosure;

FIG. 18 illustrates an excerpt of certificate details in JSON format, in accordance with one aspect of the present disclosure;

FIG. 25 illustrates a basic services screen, in accordance with one aspect of the present disclosure;

FIG. 26 illustrates a strong random number generation screen, in accordance with one aspect of the present disclosure;

FIG. 27 illustrates random numbers is JSON format, in accordance with one aspect of the present disclosure;

FIG. 30 illustrates a certificate requests menu, in accordance with one aspect of the present disclosure;

FIGS. 31-32 illustrate various aspects of a pending request queue, in accordance with one aspect of the present disclosure;

FIGS. 33-35 illustrate various aspects of CSR processing, in accordance with one aspect of the present disclosure;

FIGS. 36-41 illustrate various aspects of requesting a certificate with CSR, in accordance with one aspect of the present disclosure;

FIG. 44 illustrates certificate search results, in accordance with one aspect of the present disclosure;

FIG. 45 illustrates importing a certificate, in accordance with one aspect of the present disclosure;

The Figures depict preferred embodiments for purposes of illustration only. Alternative embodiments of the systems and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Figure 1:
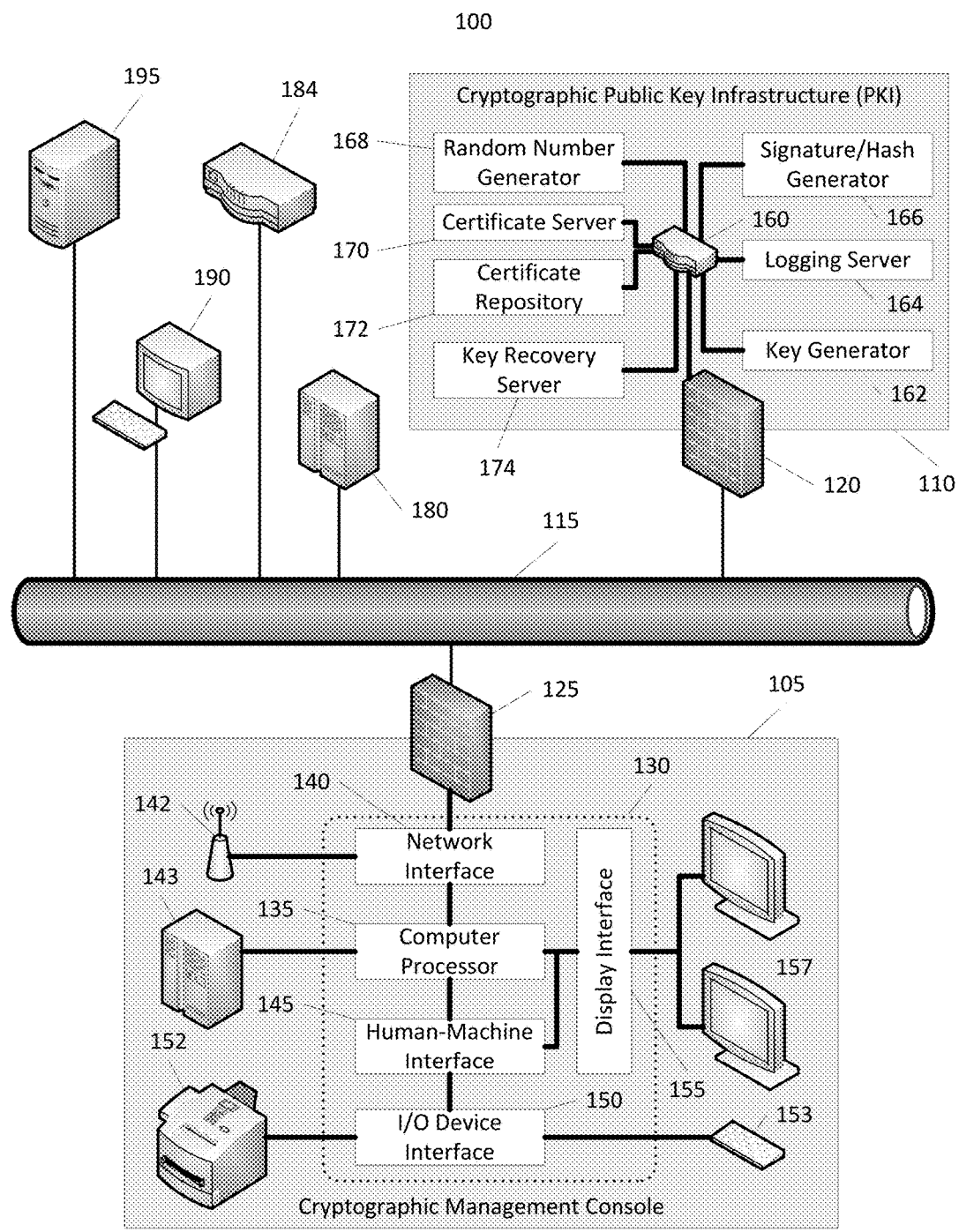
FIG. 1 illustrates an exemplary system to provide and administer cryptographic services, in accordance with one aspect of the present disclosure.

FIG. 1 illustrates one embodiment of cryptographic services system 100 that includes a cryptographic management console 105, communicatively coupled to cryptographic public key infrastructure 110 through a network 115. One exemplary embodiment includes firewall devices 120 and 125, filtering communication and providing security among a variety of network layers while the management console 105 and PKI 110 interface with the network 115.

The management console 105, in one embodiment may include a services engine 130 using a computer processor 135 communicatively coupled to a network interface 140, a human-machine interface 145, an input/output device interface 150, and a display interface 155. In other embodiments, the services engine 130 may include interfaces and devices not illustrated to perform cryptographic and computing services, and likewise may exclude illustrated devices and interfaces, for example to improve the efficiency of the engine. The network interface 140 may include a wireless access point 142, in one embodiment, to allow the engine 130 to intercommunicate with wireless devices. Some embodiments include interfaces from the engine 130 to an external server 143, while still within an enterprise firewall 125. Other embodiments may include a variety of interface devices, such as a printer 152, communicatively coupled to the I/O device interface 150, and keyboards 153. Likewise, a variety of display devices 157 may communicatively couple through the display interface 155 to project information to a user in the administration of the system 100.

The PKI 110 may include a router 160 to transmit and receive messages across devices within the PKI and behind, for example, the firewall 120. The router 160 may interface with a key generator 162, a logging server 164, a signature and hash generator 166. Likewise, the route 160 may interface with a random number generator 168, a certificate server 170, a certificate repository 172, and key recovery server 172. The public key infrastructure (PKI) 110 may in other embodiments include more or less devices and interfaces as necessary to provide public key services to an enterprise. For example, the PKI 110 may include devices distributed over a large geographic region including a plurality of routers 160 and multiple instances of the devices included in the PKI 110. In another embodiment, the PKI 110 may serve a variety of enterprises, as a common service, and thus interface with a number of cryptographic management consoles 105.

FIG. 1 illustrates embodiments wherein devices outside of a firewalled enterprise, that use or consume services from the public key infrastructure (PKI) 110. Examples of such devices include remote data servers 180 that may in some embodiments consume authentication services. Likewise, secure routers 184 may use authentication services to securely communicate and route messages over virtual private networks, in some embodiments. Secure user terminals, such as the user terminal 190, may consume signature and authentication services from the PKI 110 to identify itself while performing tasks for a specific enterprise. Remote storage devices, such as the remote archive 195, may consume encryption, authentication, and identification services from the PKI, for example to provide off-site redundancy while maintaining data security. As illustrated in FIG. 1, devices may reside outside of an enterprise firewall and communicate over a network 115 to PKI 110, taking advantage of services provided by the PKI 110.

The system 100 in FIG. 1 illustrates one embodiment of the disclosure and in no way limits any number of permutations, for example with additional or less devices, interfaces, and configurations.

In one embodiment, a Cryptographic Services Management Portal can provide a single point of interaction for both users and administrators to manage and consume cryptographic services.

Accessing such a portal may include logging into a website with a web browser. In some embodiments, an account name may include an email address with a domain name within a company. Authentication using an account from outside a particular domain name may not be supported.

Figure 2:
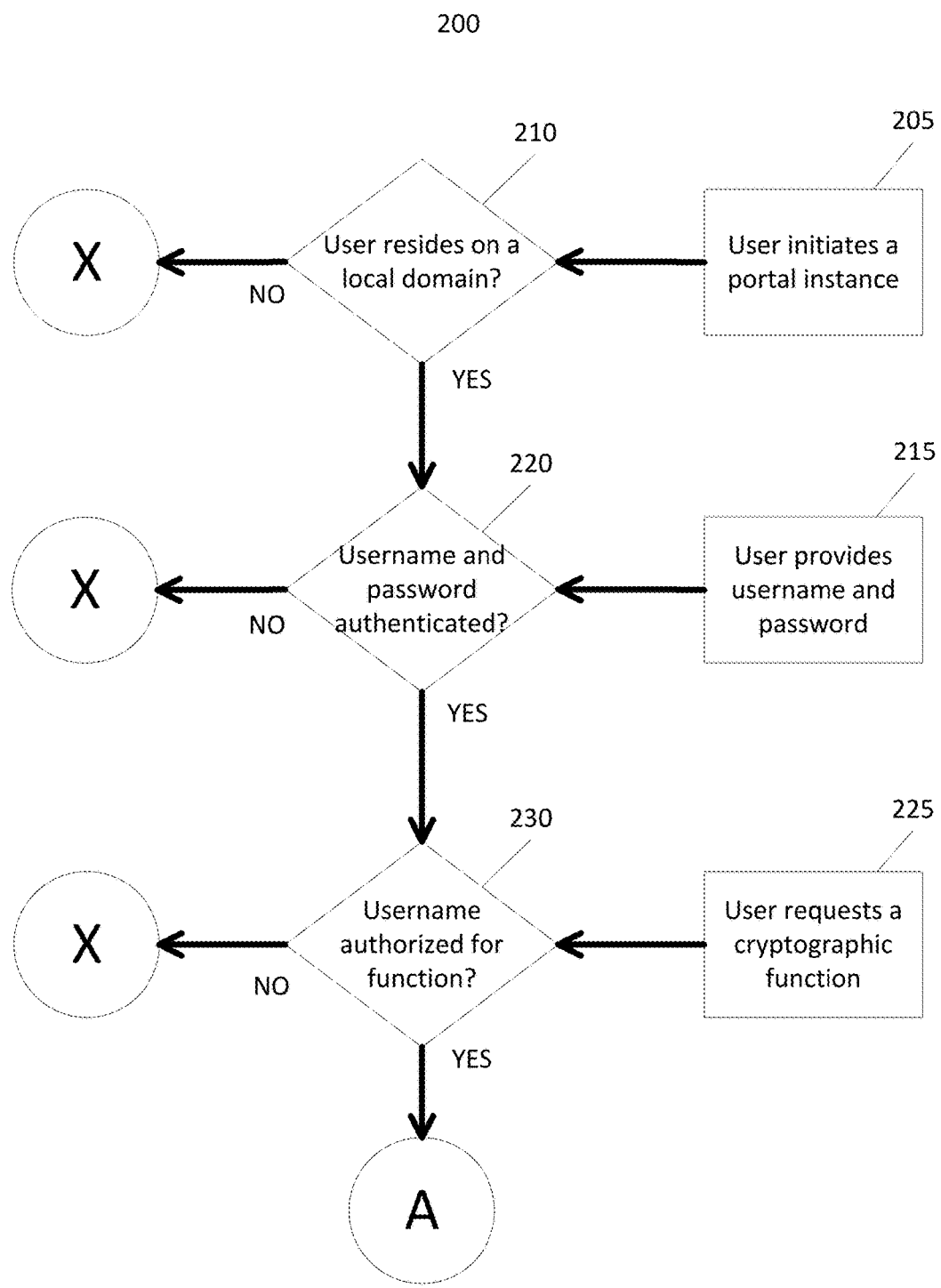
FIG. 2 illustrates an exemplary process to authenticate a user, in accordance with one aspect of the present disclosure.

FIG. 2 illustrates a process 200 wherein, in one embodiment, a user or administrator authenticates themselves by interacting with the management console 105, while administering of the public key infrastructure 110. The process includes the user initiating a portal instance (block 205). The portal instance in one embodiment may execute within the engine 130 in the processor 135, interfacing through the display interface 155 to project the portal window on one or more of the displays 157 of FIG. 1.

In one embodiment, the processor 135 may determine if the user that initiated the portal instance in block 205 resides on a local domain, for example within a subset of an enterprise determined by a subset of an internet protocol (IP) address used to instantiate the portal instance (block 210). In some embodiments, the system may determine whether a user resides on a local domain (block 210) when the user selects the login button 310 in FIG. 3. If a user resides within a domain the process 200 may continue, however if the user resides outside a domain, the process 200 may terminate.

Figure 4:
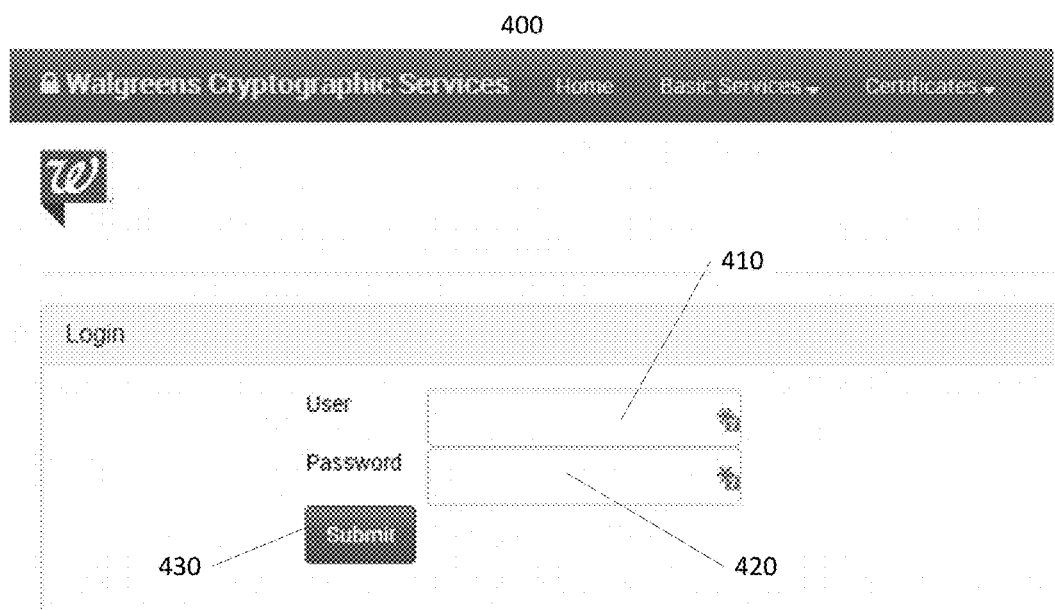
FIG. 4 illustrates a login screen, in accordance with one aspect of the present disclosure.

A user may provide a username and password (block 215), for example using the portal screen illustrated in FIG. 4. In one embodiment, when the user selects the submit button 430 of FIG. 4, the processor 135 may determine if the username and password authenticate to a known user and that the password matches the user. If the processor 135 successfully authenticates the user (block 220) the process 200 may continue, however if authentication fails the process 200 may terminate.

In another embodiment a user may request a cryptographic function (block 225), for example using the I/O device interface 150 of the engine 130. The processor 135 may determine whether or not the username provided possesses authorization for the requested function (block 230). In the embodiment wherein such authorization exists the process 200 may continue, however if the processor 135 fails to find authorization for the user, or the user is explicitly forbidden from a requested function, the process 200 may terminate.

Figure 3:
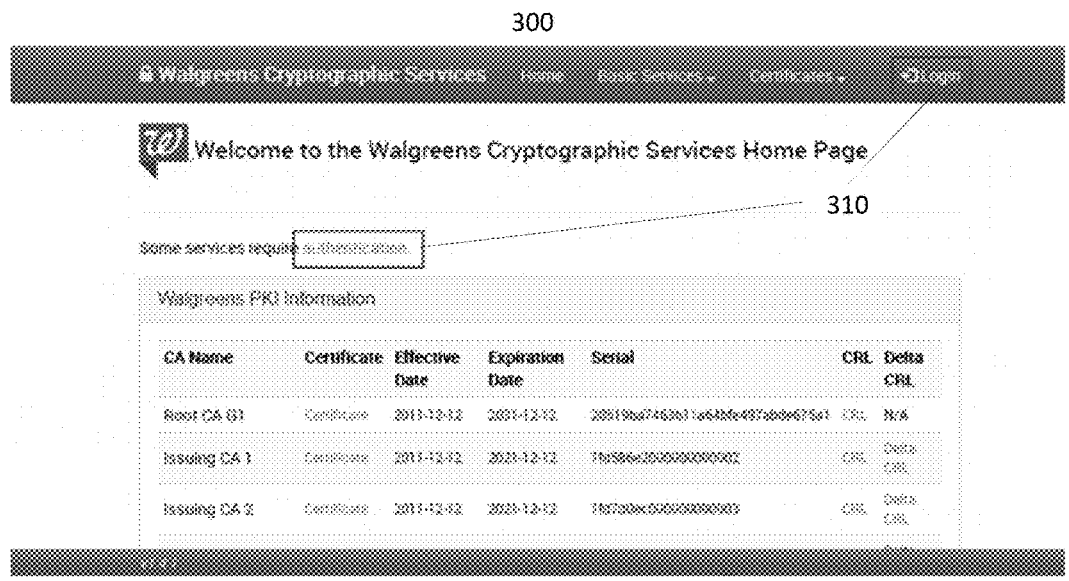
FIG. 3 illustrates an exemplary portal home page, in accordance with one aspect of the present disclosure.

FIG. 3 illustrates an exemplary portal home page 300, in accordance with an embodiment of the present disclosure, for example as described in the process illustrated in FIG. 2. A user of the portal home page 300 may interact with a login button or the hyperlink "authentication" 310 to authenticate themselves as an authorized administrator of public key services within an enterprise.

FIG. 4 illustrates an exemplary login screen 400, likewise in accordance with an embodiment of the present disclosure, for example as described in the process illustrated in FIG. 2. The login screen 400 may include in one embodiment a user field 410 and a password field 420 that when filled out by an authorized administrator and when the administrator selects a submit button 430, allows the user access to administer cryptographic service.

Figure 5:
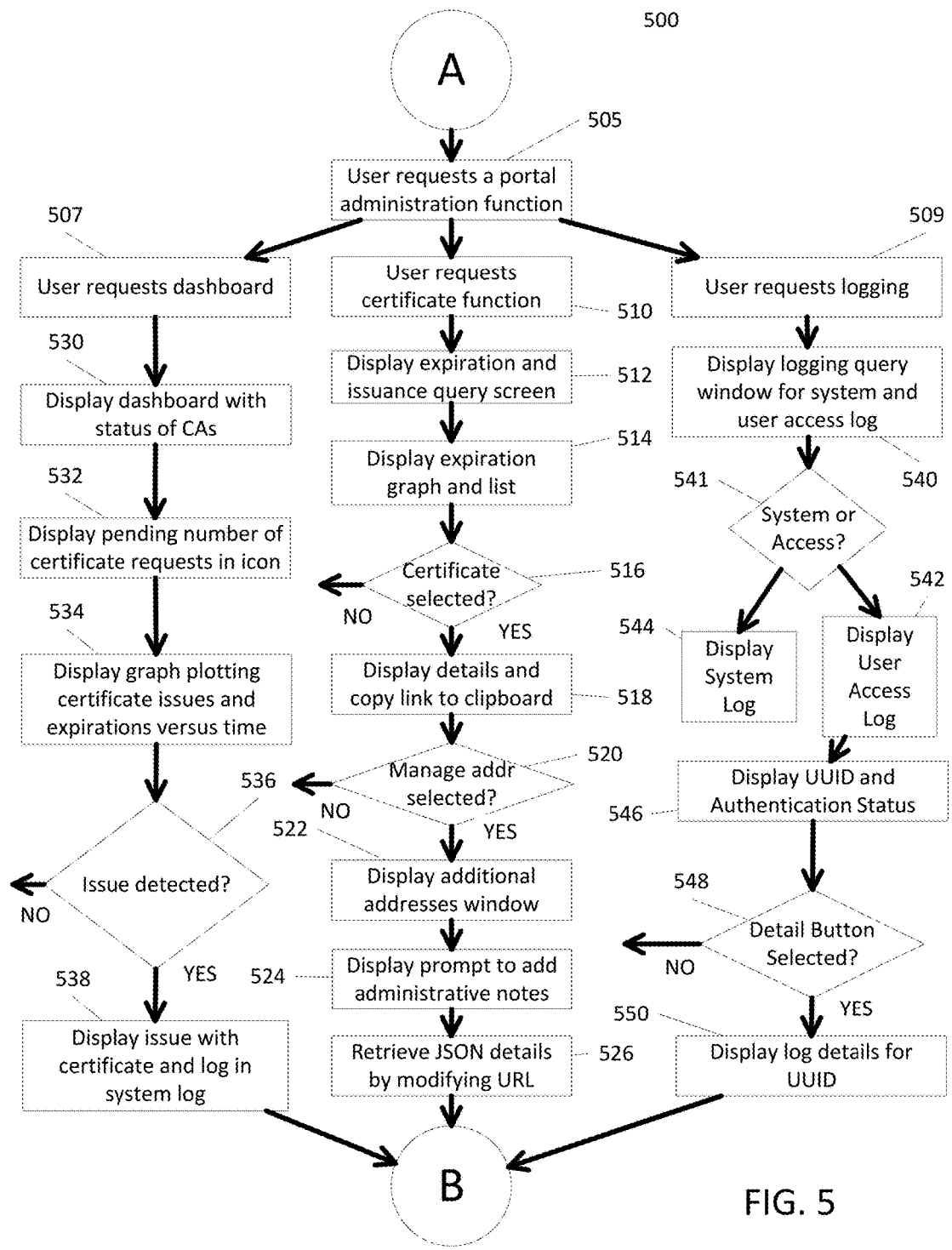
FIG. 5 illustrates an exemplary process to administer cryptographic services, in accordance with one aspect of the present disclosure.

FIG. 5 illustrates an exemplary method 500 wherein a user may administer or consume cryptographic functions for an enterprise, for example using a cryptographic services portal. The embodiments of FIGS. 6 through 23 may illustrate one example implementation of the process 500, however, these figures in no way limit the process 500 to the embodiments illustrated therein.

Figure 6:
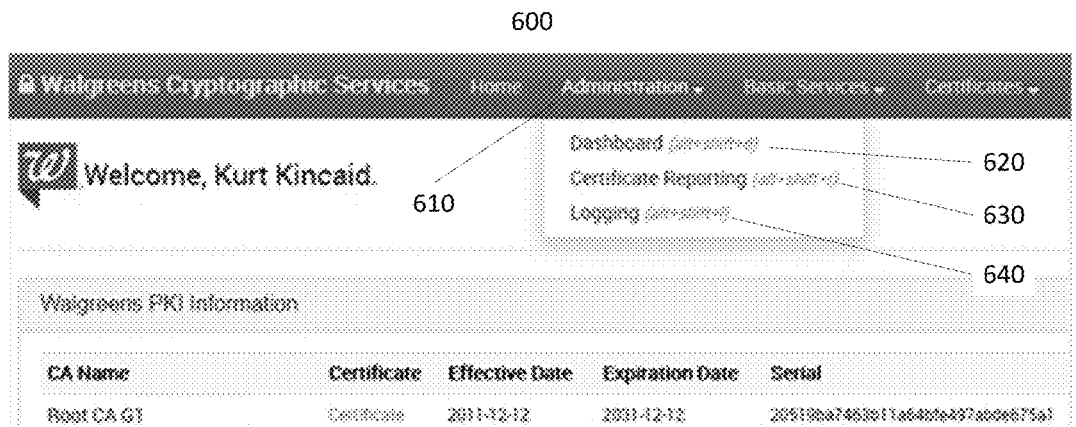
FIG. 6 illustrates an administration menu, in accordance with one aspect of the present disclosure.

A user may request a portal administration function (block 505), for example using the menu option 610 as illustrated in the portal 600 of FIG. 6. The processor 135 may illustrate on one or more displays 157 three options in the administration menu 610, for example comprising a dashboard 620, certificate reporting 630, and logging 640. If for example a user selects the dashboard 620 option (block 507), the processor 135 may display a dashboard (block 530) with the status of certificate authorities (CAs). One embodiment of a dashboard may include the dashboard 700 illustrated in FIG. 7. The dashboard in FIG. 7 includes an indication of last update 710, and the number of pending certificate requests 720.

Figure 8:
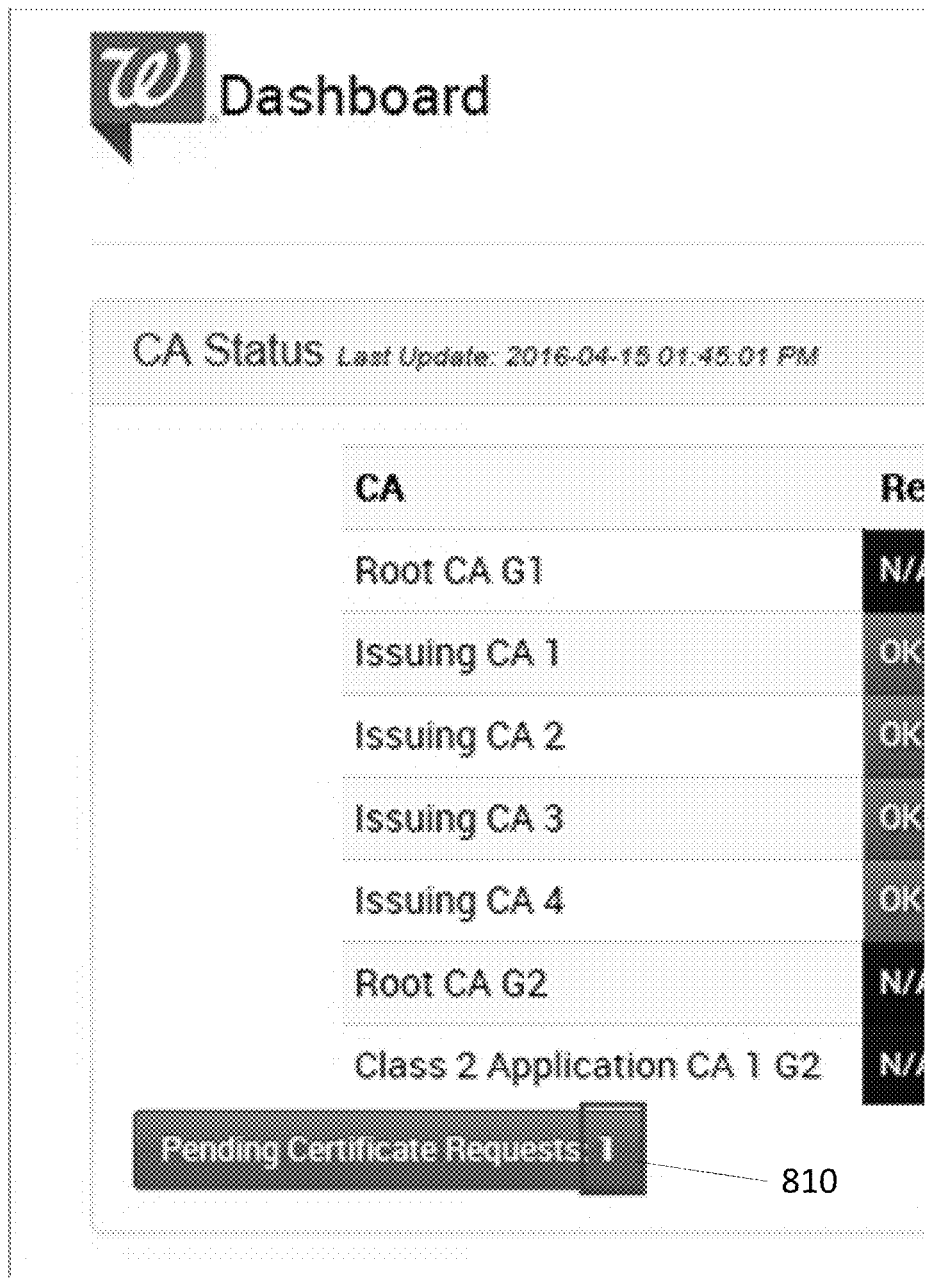

When a certificate request remains pending (block 532), the processor 135 may illustrate the number of pending certificates 810, for example in accordance with the illustrated embodiment in FIG. 8. In another embodiment, the processor 135 may illustrate a window 900 (block 534) that include a graph 910 representing a quantity of issuers and a timeline 920 representing expirations over time, in accordance with the embodiment illustrated in FIG. 9. The processor 135 may determine if an issue exists with a particular certificate revocation list (CRL) entry (block 536) and may include an indication 1010 adjacent to the CRL entry (block 538), according to the embodiment illustrated in FIG. 10. If the processor does not detect an issue, the process 500 may terminate.

In another embodiment, a user may select a certificate function 630 (block 510), for example as illustrated in FIG. 6. The processor 135 may display an expiration query 1110 and issuance query 1120 within a reporting screen 1100 (block 512), in accordance with the illustrated embodiment of FIG. 11. In one embodiment, the processor 135 may display an issuance graph 1200 (block 514), including the start and end date/time 1210, and number of certificates 1220. Likewise, the processor 135 may display an expiration list 1300 (block 514), including unique identifiers 1310 for the certificates, and a send email icon 1320, in accordance with the illustrated embodiment in FIG. 13.

Figures 13, 14:
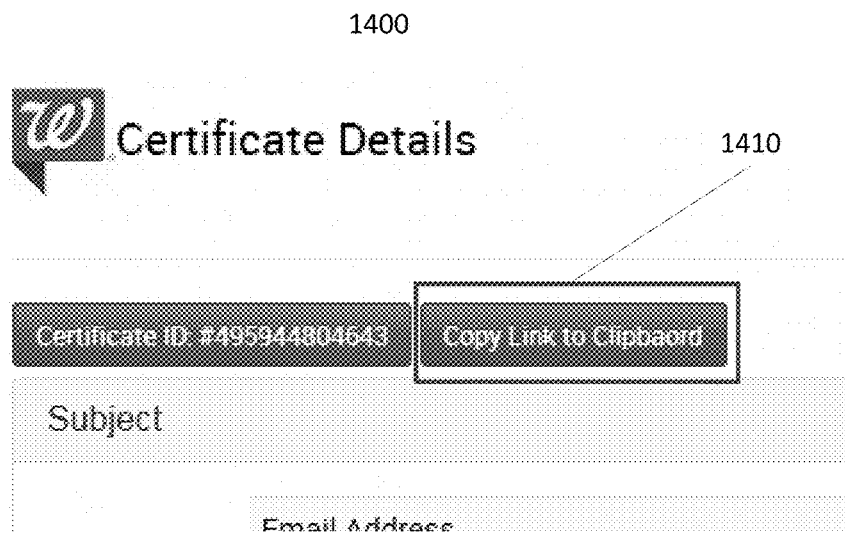
Figures 15, 16:
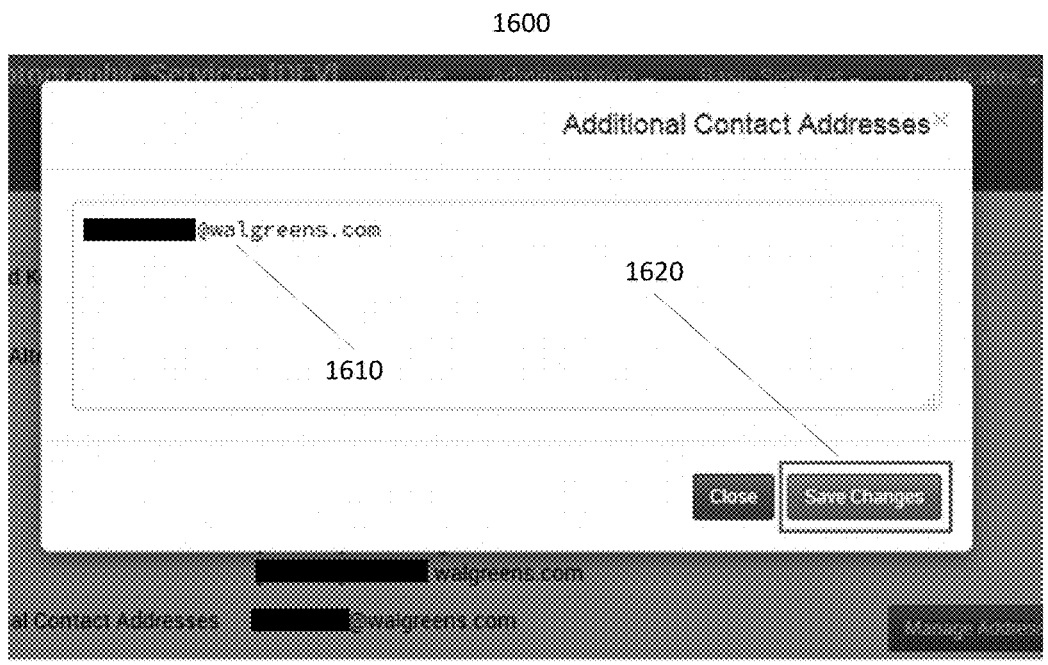

The processor 135 may determine if a user selects an identifier 1310 (block 516), and display the certificate details 1400 (block 518), including an icon to copy a link to clipboard 1410, as illustrated in the embodiment of FIG. 14. In an alternative embodiment a user may not select a certificate and the process 500 may terminate. One embodiment includes the processor 135 determining if a user selects a manage addresses indicator 1510 as illustrated in FIG. 15, and if selected (block 522), displaying an additional contact addresses window 1600. The window 1600 may include a space to enter an email address 1610, and a save changes indicator 1620. If a user selects the indicator 1620 (block 524), the processor 135 may illustrate an administrative notes window 1700, including a space for notes 1710, and a timestamp indicator 1720. In another embodiment, a user may modify a URL to retrieve JSON details 1800 associated with a certificate, as illustrated in FIG. 18.

Figure 19:
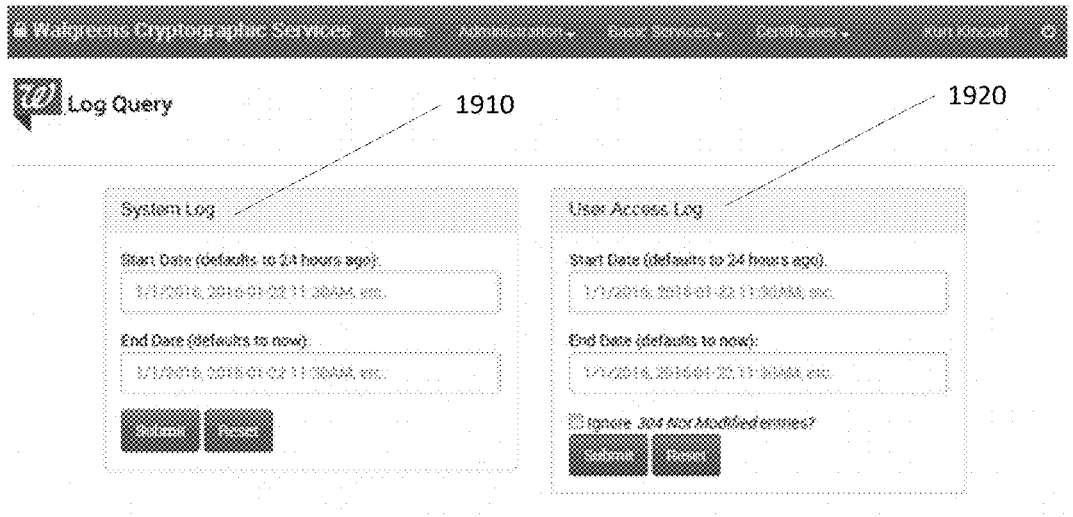
FIG. 19 illustrates a logging screen, in accordance with one aspect of the present disclosure.
Figure 20:
FIG. 20 illustrates a system log, in accordance with one aspect of the present disclosure.
Figure 21:
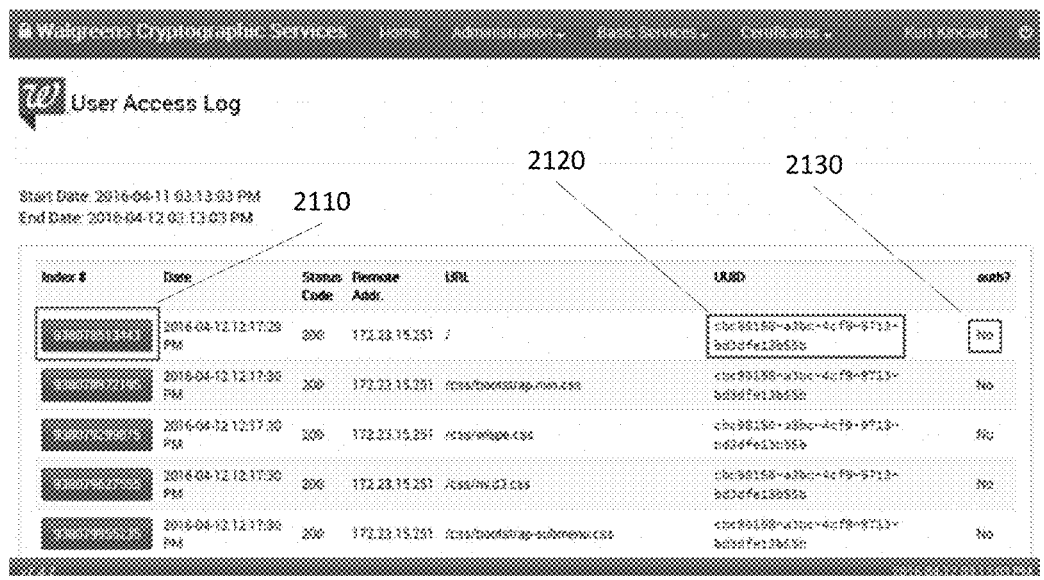
FIGS. 21-23 illustrate various aspects of an access Log, in accordance with one aspect of the present disclosure.
Figure 23:
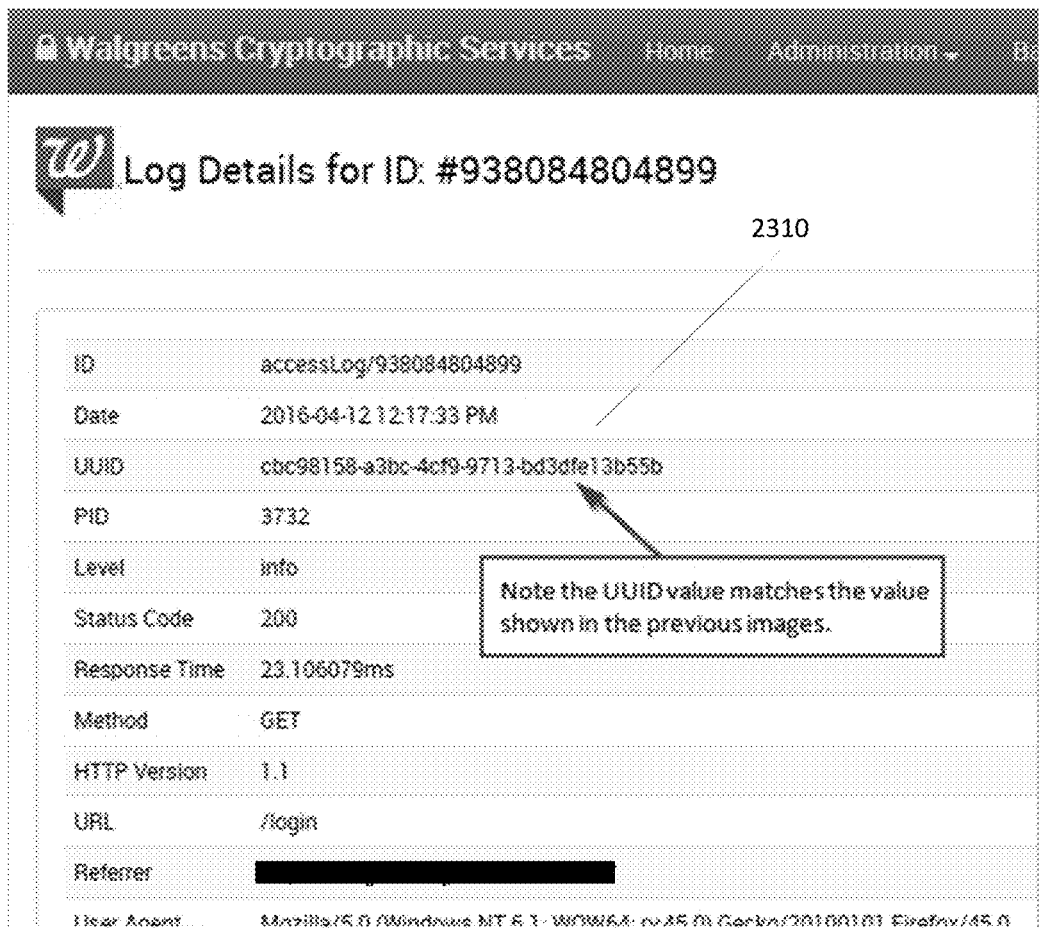

Another embodiment includes a user selecting the logging option 640 (block 509) as illustrated in FIG. 6. The processor 135 may display a log query window 1900 including system log 1910 and user access log 1920 entries (block 540), as illustrated in FIG. 19. The processor may determine if the user selects a system or access log option (block 541), and in one embodiment, illustrate a system log 2000 (block 544), as illustrated in FIG. 20. The system log 2000 of FIG. 20 may include identifiers for certificate IDs 2010 for selection and further information. In an alternative embodiment, the processor 13 displays user access log 2100 (block 542), including an index identifier 2110, a UUID 2120, and an indication as to whether the user was authenticated at the time of access 2130, as illustrated in FIG. 21. The processor 135 may display user access log 2200, including a single UUID 2210 and subsequent authentication statuses 2220 and 2230 showing that a user is first not authenticated (block 546), and subsequently authenticated in the same session. In one embodiment, the processor 135 may determine if a user selects a details indicator, for example the indicator 2110. If so, the processor 135 may display the log details window 2300 (block 550) including the UUID for that log entry 2310 as illustrated in FIG. 23. In an alternative embodiment, the processor determines that a user has not selected an indicator 2110 (block 548), and the process 500 may terminate.

FIG. 6 illustrates an exemplary administration menu, in accordance with an embodiment of the present disclosure. Once authenticated and authorized, additional functionality may be available through a menu bar, as illustrated in FIG. 6, at the top of the screen. An administration menu may provide reporting of various types.

Figure 7:
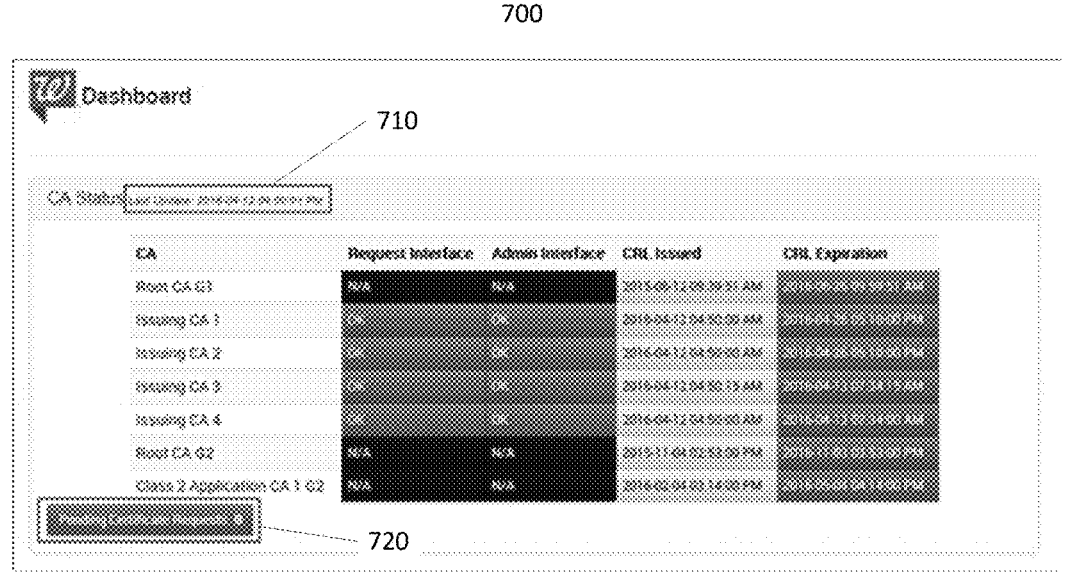
FIGS. 7-10 illustrate various aspects of an exemplary dashboard, in accordance with one aspect of the present disclosure.

FIG. 7 illustrates a dashboard, in accordance with an embodiment of the present disclosure. The dashboard may contain the current status of the CAs, for example, updated on 15 minute intervals. The dashboard may display the number of pending certificate requests, for example as illustrated in FIG. 8.

Figure 9:
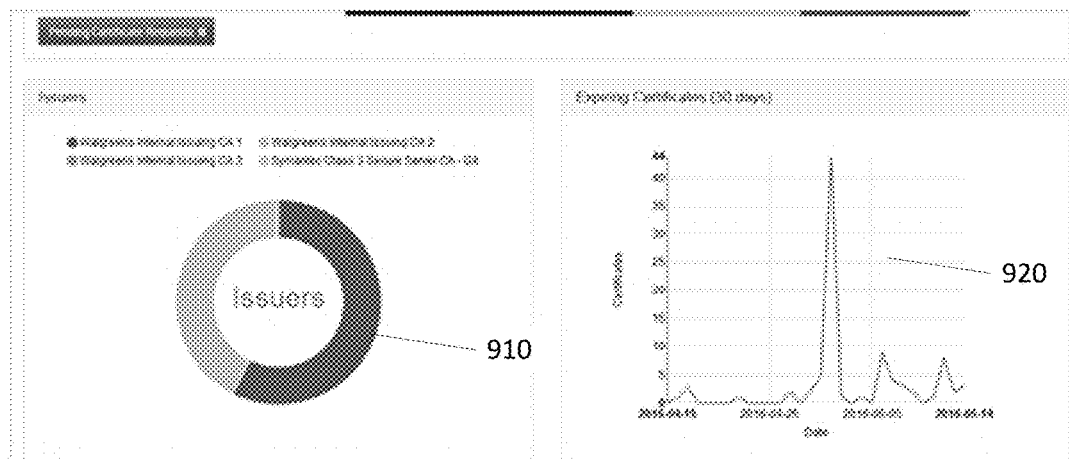

In another embodiment, the dashboard may include a line graph showing the certificate expirations over the next 30 days, as well as a graph showing the known certificate issuers, as illustrated in FIG. 9.

Figure 10:

When an issue is detected, in one embodiment, the dashboard may clearly display the issue on the dashboard, for example as illustrated in FIG. 10, and will log the issue in the system log.

Figures 11, 12:
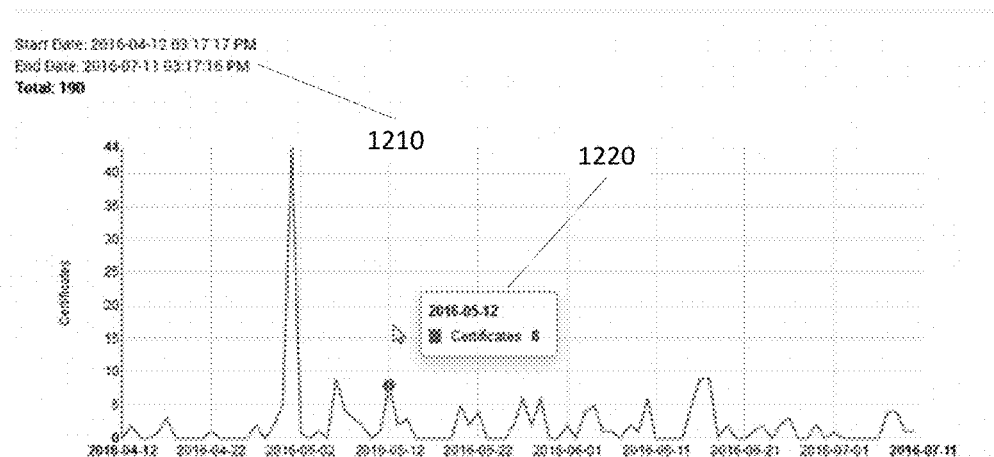
FIG. 11 illustrates a certificate reporting screen, in accordance with one aspect of the present disclosure.
FIG. 12 illustrates a certificate expiration graph, in accordance with one aspect of the present disclosure.

Certificate reporting, for example as illustrated in FIG. 11, may allow generation of reports on both certificate expiration and certificate issuance over a range of days or months. An expiration report may be exported in JSON or CSV format.

As illustrated in FIG. 12, a graph illustrating certificate expirations over time may be shown at the top of a report page, followed by a sequential list of certificate expirations, as illustrated in FIG. 13.

The exemplary list of certificate expirations in FIG. 13 includes a button that takes a user to details for a particular certificate, as well as a button for sending an email regarding the certificate.

The exemplary certificate details page, illustrated in FIG. 14, includes at the top of the detail page, a copy link to clipboard button, that copies the permanent link to that certificate to a clipboard for pasting into, for example, emails and documents. Each certificate may include its own unique ID value, reflected, for example, in the URL.

FIG. 15 illustrates an exemplary certificate details page that includes a button for managing additional contact email addresses. In one embodiment, when a user clicks on the manage addresses button a popup box may appear where a user can add, modify, or delete addresses. When finished editing the email addresses, a user may click save changes, as illustrated in FIG. 16, and be returned to the certificate details page where the new email addresses may be displayed.

At the bottom of an exemplary certificate details page, as illustrated in FIG. 17, is an Administrative Notes section that may in one embodiment, remain visible to administrators, and may allow adding additional notes or information regarding the certificate. A user's name and the current timestamp may in one embodiment be included automatically. The exemplary editor illustrated in FIG. 17 may support basic HTML formatting, including bullet lists, tables, and colors, that may be included with each note.

A user may in one embodiment retrieve certificate details in JSON format, for example, by appending "?json=true" to a URL. FIG. 18 illustrates an example of certificate details in JSON format, in accordance with one embodiment of the present disclosure.

A portal may include at least two types of logs, that a user may access through a log query page, for example as illustrated in FIG. 19.

A system log, as illustrated in FIG. 20 may capture application level information, such as successful authentication, certificate issuance, certificate importing, new notes, and new email addresses. System log messages that involve a particular certificate may include a link directly to that certificate. Log messages may also indicate whether or not a user is an administrator or not.

An exemplary access log, such as the access log illustrated in FIG. 21, may include typical web server access information, including additional features explained below.

Figure 22:
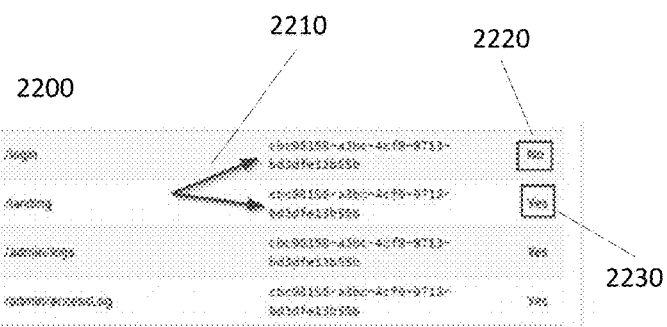

An access log message may contain a link to the details of that particular message, a unique UUID value, as illustrated in FIG. 22, assigned to a given browser session, and an indicator of whether or not a user is authenticated. The UUID value may present forensic information, for example, as the UUID value remains constant before, during, and after the user's session, as illustrated in FIG. 23.

Items in the System Log entries may include a UUID associated with that session. In one embodiment, when the user closes their browser or when the session completely expires due to inactivity, a new UUID value may be assigned. Log details may contain the full request and response headers.

Figure 24:
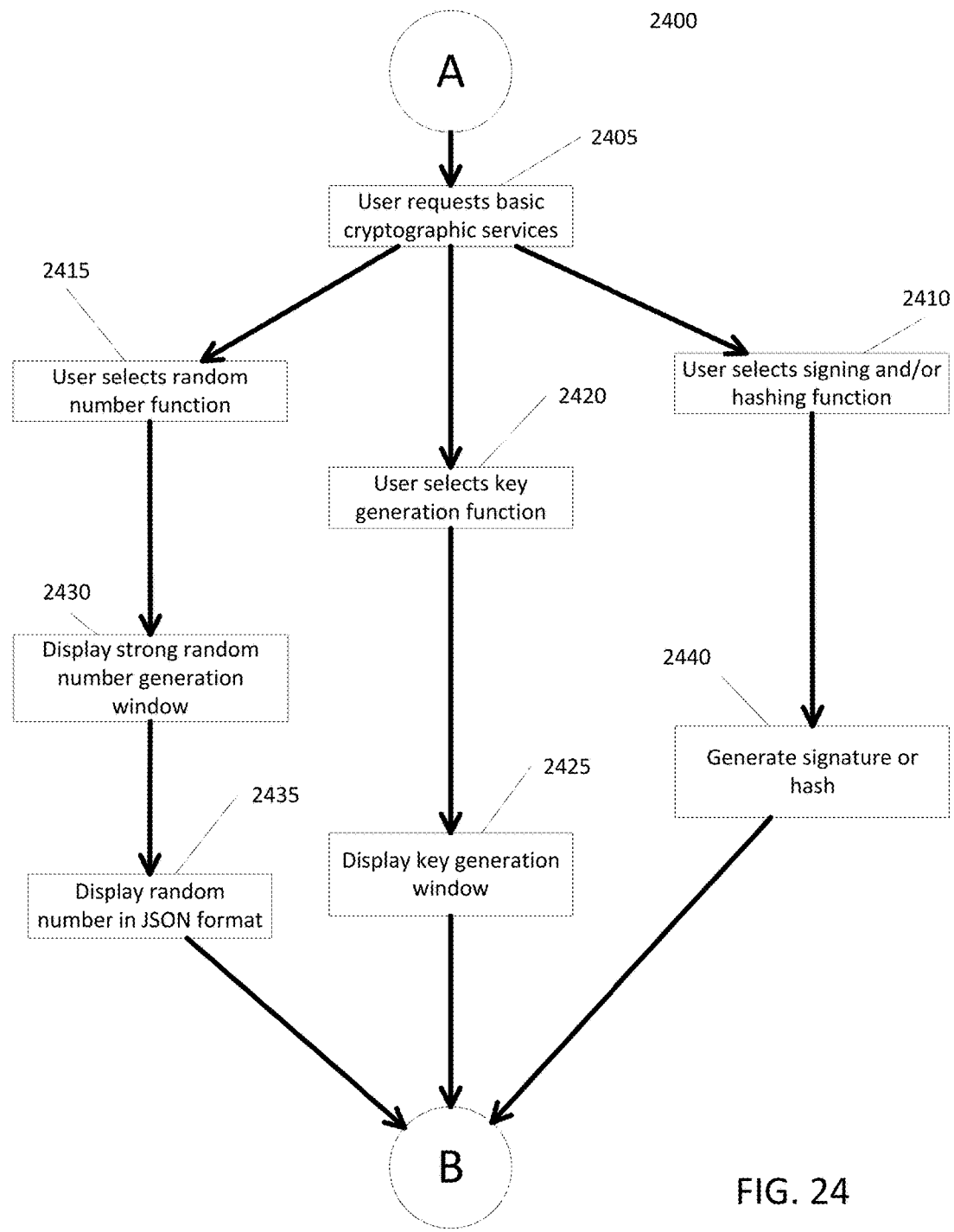
FIG. 24 illustrates an exemplary process to administer cryptographic services, in accordance with one aspect of the present disclosure.

FIG. 24 illustrates an exemplary process 2400 wherein a user may select basic cryptographic services, for example from the basic services option 2510 in window 2500 illustrated in FIG. 25. A user may select the basic services menu option 2510 (block 2405), for example of FIG. 25. From the basic services menu a user may select (block 2415) the strong random numbers option 2520. According to one embodiment, the processor 135 may display (block 2430) a strong random number generation window 2600 of FIG. 26 that includes a random number 2610. In another embodiment, the processor 135 may display (block 2435) the random number in JSON format.

Figure 28:
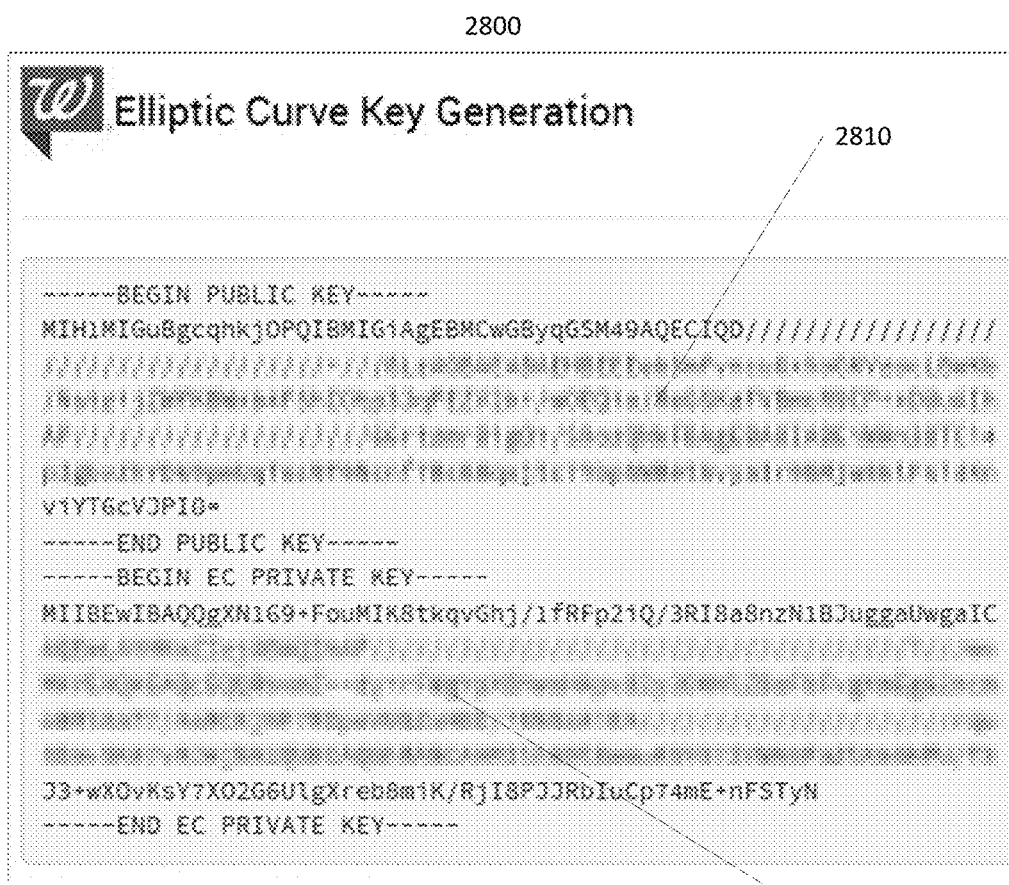
FIG. 28 illustrates an example of a key generation screen, in accordance with one aspect of the present disclosure.

In an alternative embodiment, the user may select the key generation option 2530 (block 2420). The processor 135 may display a elliptic curve key or RSA key generation window 2800 (block 2425), including a public key 2810 and a private key 2820, as illustrated in FIG. 28. Another alternative embodiment includes a user selecting (block 2410) a signing and hashing option 2540, as illustrated in FIG. 25. The processor 135 may generate a signature or hash (block 2440) for a given input.

A variety of basic cryptographic services may be available through the Basic Services menu, as illustrated in FIG. 25.

In one embodiment, a user may generate cryptographically secure random numbers available through a web page, such as illustrated in FIG. 26, or as JSON data, as illustrated in FIG. 27. A default for strong random number may include 128 bytes, however, this value can be any number up to 4096 bytes by adding the number of requested bytes at the end of a URL. Random numbers can be retrieved in JSON format by appending "?json=true" to the end of the URL.

In another embodiment, a user may generate elliptic curve and RSA asymmetric encryption keys various key lengths, as illustrated in FIG. 28. A default RSA key length may include 2048 bits and a default elliptic curve key may include 256 bits, for example, using a secp256k1 curve. A webpage may include instructions for requesting different lengths and for requesting keys in JSON format. A user, in another embodiment, may generate hashes and HMACs using a variety of different algorithms.

Figure 29:
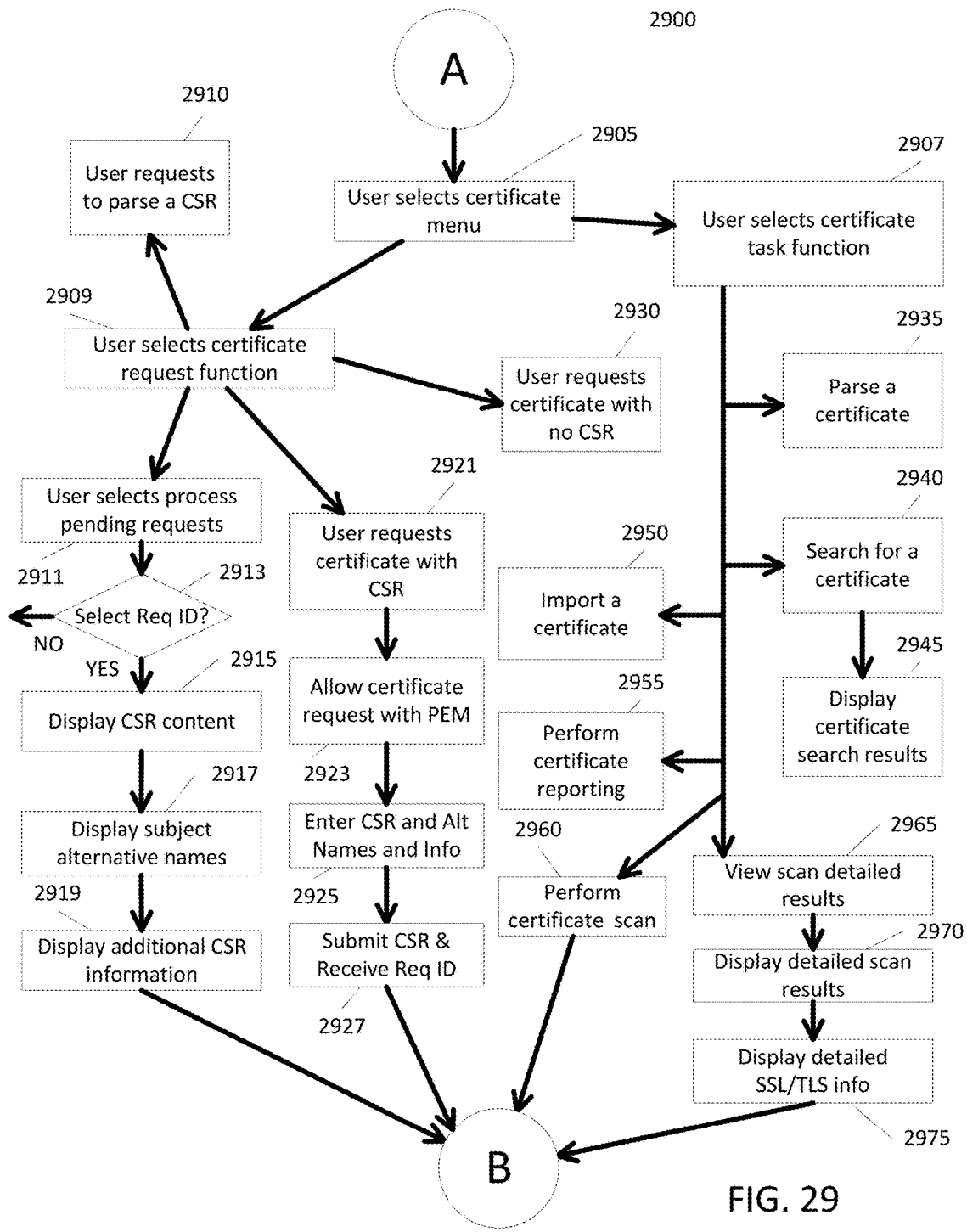
FIG. 29 illustrates an exemplary process to administer cryptographic services, in accordance with one aspect of the present disclosure.

FIG. 29 illustrates an exemplary method 2900 wherein a user may select a variety of certificate functions. A user may select (block 2905) from certificate menu option 3000, including a plurality of sub options, as illustrated in FIG. 30. In one embodiment the user may select (block 2909) the certificate request option 3010 and the processor may display a parse a CSR option 3020, process pending requests option 3030, request a certification (no CSR) option 3040, and request a certificate (with CSR) option 3050, as illustrated in FIG. 30.

In one embodiment, a user may select the parse a CSR option 2910 and the processor 135 that may display the content of a Base 64, PEM encoded CSR. In another embodiment, the user may select (block 2911) the process pending requests option 3030, and the processor 135 may display a window 3100 indicating no pending requests as illustrated in FIG. 31 in one embodiment. In another embodiment, the processor 135 may display window 3200 (block 2911) wherein a pending request with a request ID 3210. The processor may determine (block 2913) if a user selects the request ID 3210 and display the content of the CSR (block 2915), for example using window 3300 of FIG. 33. In an alternative embodiment the processor 135 may determine that a user did not select request ID 3210 and the process 2900 may terminate.

Figure 35:
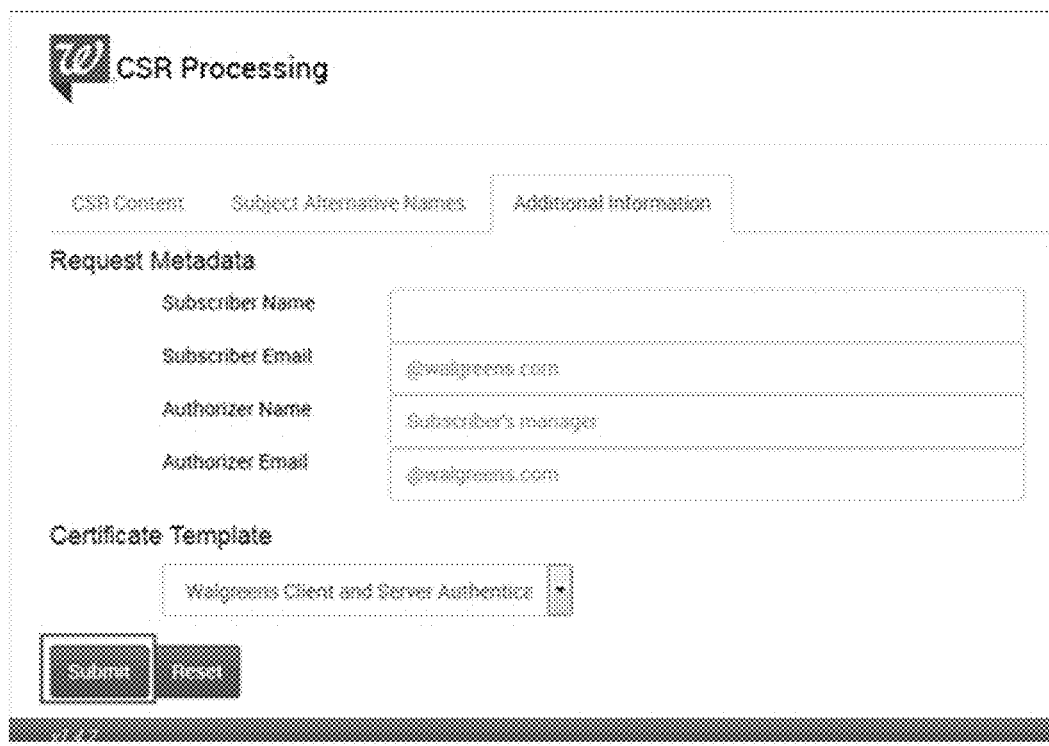

The processor 135 may display (block 2917) window 3400 that displays subject alternative name information, for example as illustrated in FIG. 34. In another embodiment, the processor 135 may display window 3500 (block 2919) providing additional information as illustrated in FIG. 35.

Figure 36:
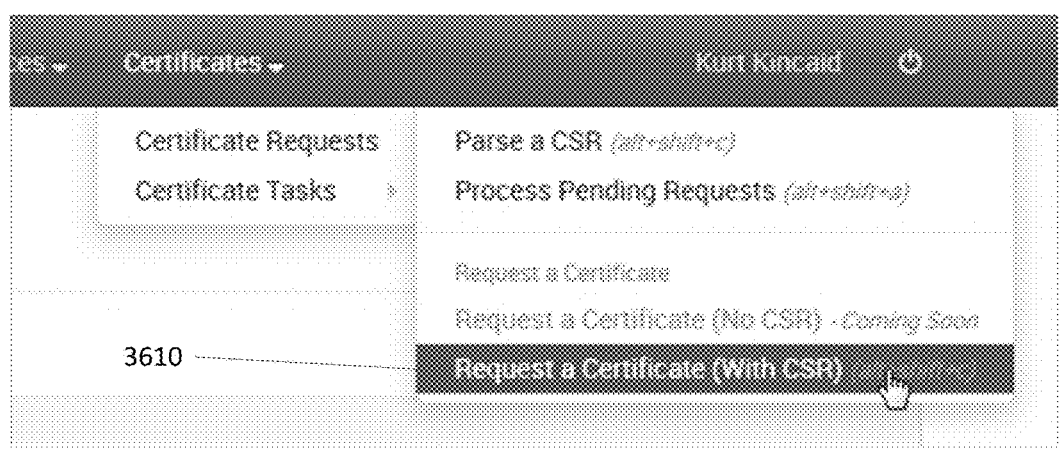
Figure 41:
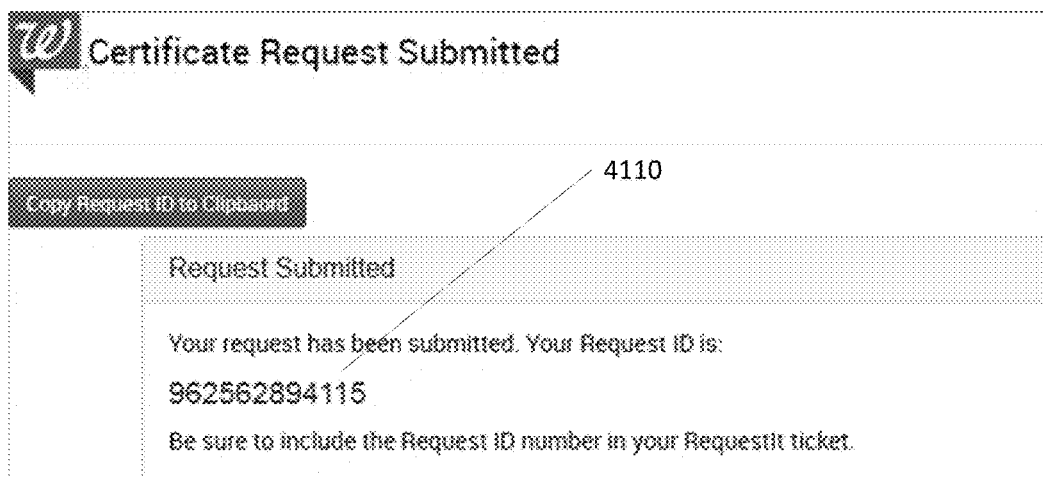

In an alternative embodiment, the user may select (block 2930) the request for a certificate with no CSR option 3040. In yet another embodiment, the user may select (block 2921) the request for a certificate with CSR option 3610 as illustrated in FIG. 36. The processor 135 may display (block 2923) window 3700 allowing entry of CSR PEM data 3710 as illustrated in FIG. 37. In another embodiment, the processor 135 may display window 3800 with CSR content (block 2925), window 3900 with subject alternative names, and window 4000 with additional information, as illustrated in FIGS. 38, 39, and 40. FIG. 40 may include a submit indicator that when selected by a user (block 2927) causes the processor 135 to display window 4100 including request ID 4110, as illustrated in FIG. 41.

Figure 42:
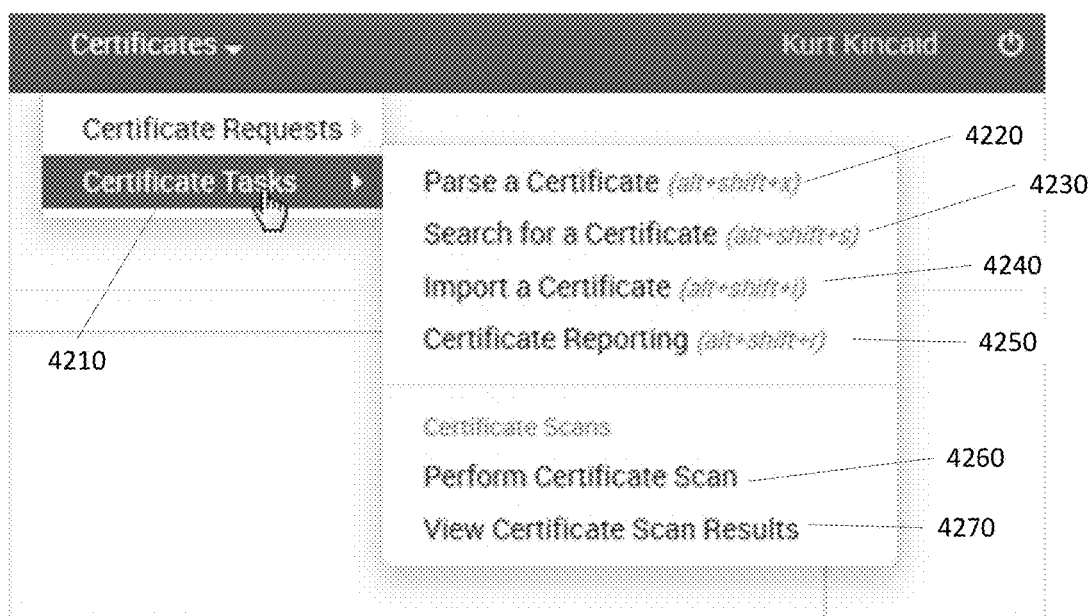
FIG. 42 illustrates certificate tasks, in accordance with one aspect of the present disclosure.

In another alternative embodiment a user selects the certificate tasks option 4210 of FIG. 42, providing a variety of options (block 2907) including a parse a certificate option 4220, a search for certificate option 4230, an import a certificate option 4240, a certificate reporting option 4250, a perform a certificate scan option 4260, and a view certificate scan results option 4270. When a user selects the parse a certificate option 4220 (block 2935), the processor parses a certificate, in accordance with one embodiment. When a user selects (block 2940) the search for a certificate option 4230, the processor displays window 4300 of FIG. 43 for a user to enter and submit certificate details. In one embodiment, when the user submits details from window 4300, the processor 135 displays window 4400 with lookup results and status indicators (block 2945) for revoked 4410, valid 4420, and expired 4430 certificates.

Figures 44, 45:
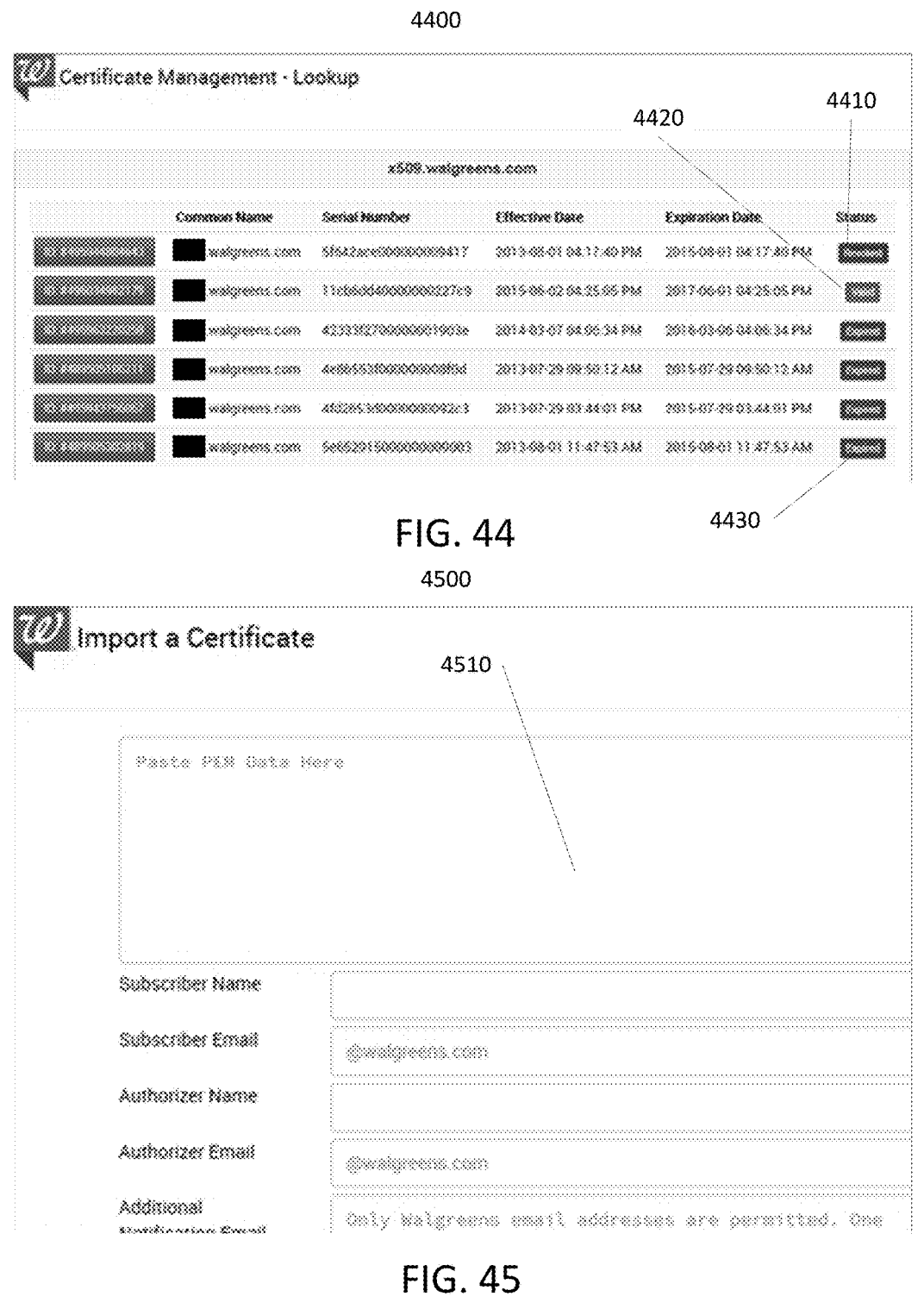

A user may select (block 2950) the import a certificate option 4240, and the processor may display window 4500 allowing a user to paste PEM data 4510 as illustrated in FIG. 45. The user may select (block 2955) the certificate reporting option 4250 and the processor may generate a report related to certificates and their current status.

In one embodiment, the user may select the perform certificate scan option 4260 (block 2960) and the processor 135 may display window 4600 requesting a hostname and port. A user may select (block 2965) the view certificate scan results option 4270 and the processor 135 may display window 4700 with certificate information, and the processor 135 displays (block 2975) SSL/TLS information regarding the certificate information from the hostname and port, in one embodiment.

An exemplary certificates menu, as illustrated in FIG. 30, may include whether a task is related to certificate requests or to certificates, including several options. For example, a parse a CSR option may include a basic service that does not require authentication and that displays the content of a Base 64, PEM encoded CSR.

A process pending requests menu, such as the example illustrated in FIG. 31, allows an administrator to access pending requests and indicate if there are no pending requests.

As illustrated in FIG. 32, if requests exist in the pending queue, administrators may change or add certificate related information, such as authorizer name and email, additional contact addresses, prior to issuance. In one embodiment, requests that have passed the basic error checks will appear in the pending queue. In another embodiment, an option to submit a CSR for signing may not appear if the CSR fails a basic error check.

FIG. 33 illustrates an exemplary embodiment of a CSR Processing window, with FIG. 34 illustrating an option for subject alternative names, and FIG. 35 illustrating an option to add additional information related to metadata.

In one embodiment, once a certificate is issued, an administrator may be taken to the details page for that certificate. At such time, a link to the details page, automatically, or by way of a copy to clipboard button at the top of the screen, may be copied and pasted in an email to a subscriber, letting the user know that the request has been completed.

FIG. 36 illustrates an exemplary embodiment wherein a user requests a certificate with a CSR. This feature may be available to administrators, for example to process requests where the user supplies a pre-generated CSR, or to any authenticated user, where they may upload their CSR and additional information for the pending queue.

Various checks may be performed on the CSR. In the event of errors, these errors may be identified and the user may not be able to submit the CSR to the queue until the errors are corrected. If there are no errors, the additional information may be included and the request may be placed into the pending queue. A unique pending request ID may be generated, as illustrated in FIG. 36, and displayed to the user. For non-administrator users who submit such as request this way may be directed to include the request ID in a service ticket.

FIGS. 36 to 41 illustrate an exemplary embodiment wherein a user requests a certificate with a CSR. FIG. 36 illustrates an embodiment wherein a user selects the request a certificate (with CSR) option. FIG. 37 illustrates an embodiment that displays CSR PEM data to a user. FIG. 38 illustrates an embodiment wherein various biographical information related to the CSR and the user. FIG. 39 illustrates an embodiment wherein subject alternative name information is entered and displayed. FIG. 40 illustrates another embodiment wherein a user enters additional information and submits a CSR. FIG. 41 illustrates a certificate request submitted webpage wherein a request ID presents to the user.

Figure 43:
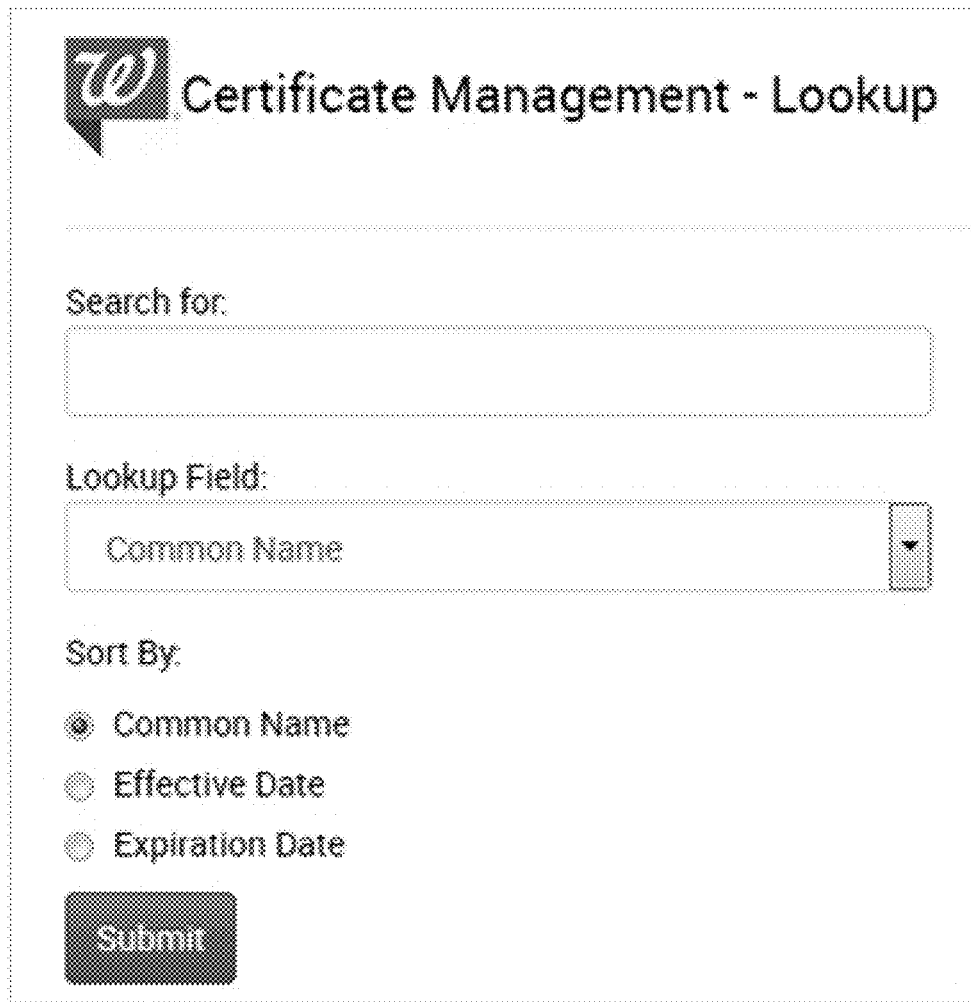
FIG. 43 illustrates a certificate search, in accordance with one aspect of the present disclosure.

An exemplary certificate tasks window illustrated in FIG. 42 includes several options available under certificate tasks. The parse a certificate option may display the content of a PEM formatted certificate. The search for a certificate option, as illustrated in FIG. 43, may perform a search for a certificate against the database of known certificates. The search may not be case-sensitive and allow results to be sorted by common name, effective date, or expiration date. Results, such as illustrated in FIG. 44, may include certificates that match the search query, regardless of certificate status. A certificate status of Valid, Expired, or Revoked may display on a list of results, and links take a user to a details page for each certificate.

An import certificate option, as illustrated in FIG. 45, may include an option for the user to import a certificate that was not issued by a particular PKI into a certificate management tool. Pasting a PEM formatted certificate into the form may also include the same information that would be included with a certificate request, such as contact addresses. Once imported, in one embodiment, a certificate may become available for management and searches. In another embodiment, an administration menu many include a certificate reporting link.

Figure 46:
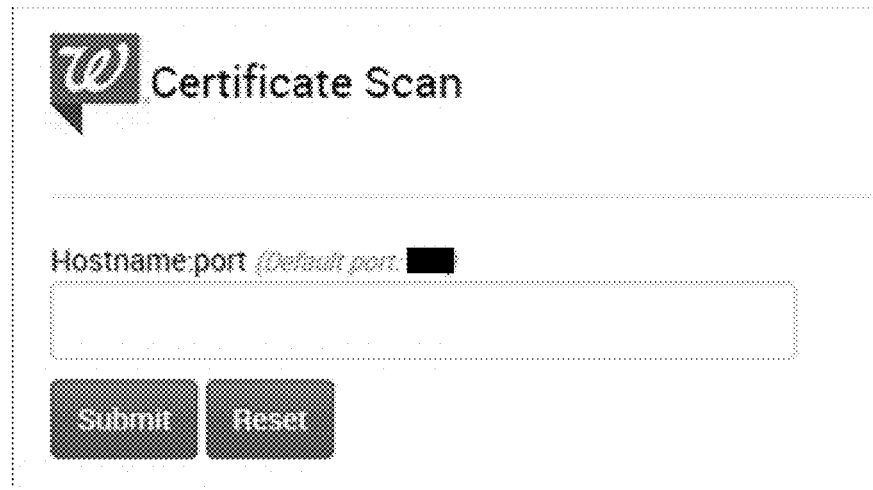
FIG. 46 illustrates performing a certificate scan, in accordance with one aspect of the present disclosure.
Figure 47:
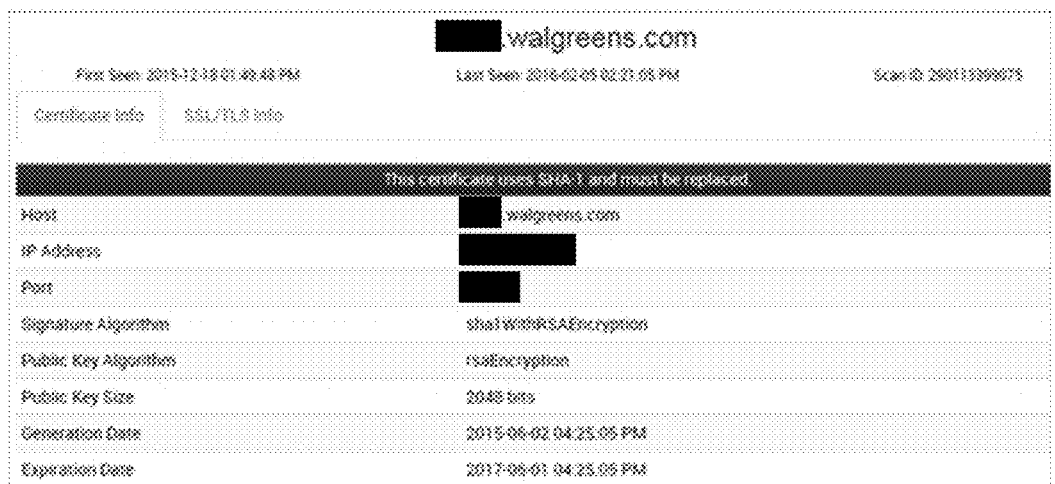
FIGS. 47-48 illustrate scan results with certificate information, in accordance with one aspect of the present disclosure.
Figure 48:
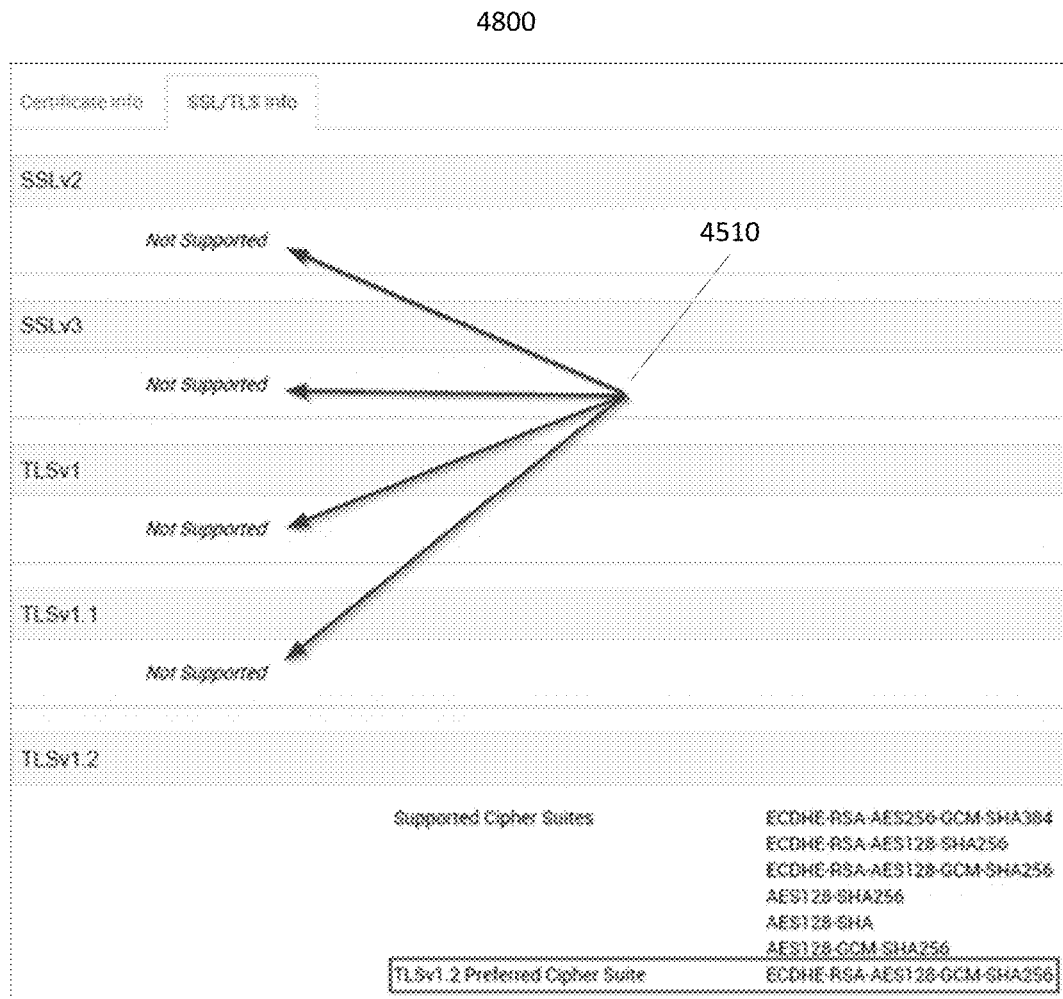

As illustrated in FIG. 46, a user may perform a certificate scan, wherein authenticated users may enter the address of an internal server, optionally including the port. In one embodiment, a database may store certificate scans. In another embodiment, when a user performs a scan, the system may check for a match already in the database. When the system finds a match, in one embodiment, the system may modify a last seen value, setting the last seen value to the time of the latest scan. If the system lacks an exact match, the system may create a new entry for the scan in the scan database. In one embodiment, a system may interrogate a server for its certificate and TLS configuration. Results, as illustrated in FIGS. 47 and 48 may include detailed certificate information, which protocols are enabled (SSLv3, TLSv1, etc.), which cipher suites are available, and which cipher suite is preferred for each protocol.

Figure 49:
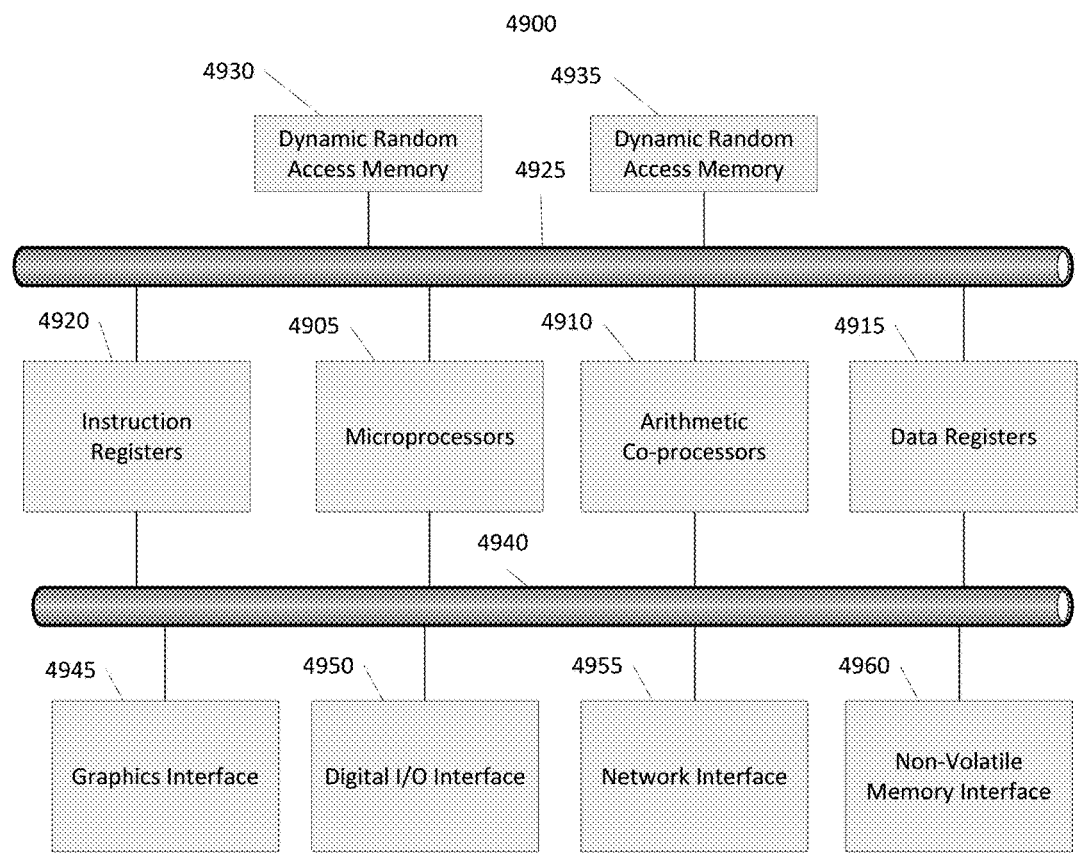
FIG. 49 illustrates an exemplary computing system, in accordance with one aspect of the present disclosure.

FIG. 49 illustrates an exemplary computing system 4900, that includes one or more microprocessors 4905, coupled to supporting devices through multi-access busses 4925 and 4940. Dynamic random access memory 4930 and 4935 may interface to data bus 4925, and store data used by the one or more microprocessors 4905. The system 4900 includes instruction registers 4920 that store executable instructions for the one or more microprocessors 4905, and data registers 4915 that store data for execution. In some embodiments, the system 4900 includes one or more arithmetic co-processors 4910, to assist or supplement the one or more microprocessors 4905. Data bus 4940 includes interfaces to a graphics interface 4945 that may in some embodiments process and transmit graphical data for a user on a display or similar devices. Likewise, data bus 4940 includes interfaces for a digital I/O interface that processes and transmits, for example, keyboard, pointing device, and other digital and analog signals produced and consumed by users or other machines. A network interface 4955 processes and transmits encoded information over wired and wireless networks to connect the system 4900 to other machines and users. Data bus 4940 also includes at least one interface to a non-volatile memory interface, that may process and transmit data that resides on non-volatile memory devices.

Figure 50:
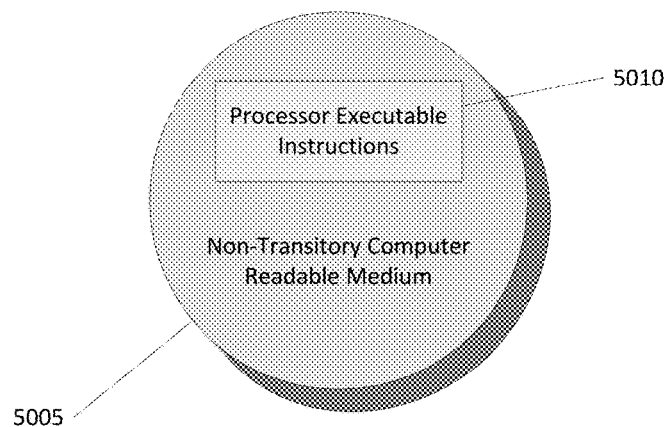
FIG. 50 illustrates an exemplary non-transitory computer readable medium, in accordance with one aspect of the present disclosure.

FIG. 50 illustrates a non-transitory computer readable medium 5005, that comprises processor executable instructions 5010. Such processor executable instructions may include instructions executed by the one or more processors 135 of FIG. 1, and/or one or more microprocessors 4905 of FIG. 49.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A cryptographic services system, that includes:
   a computer processor;
   at least one interface, the at least one interface including at least one network interface, the at least one interface configured to translate a plurality of cryptographic services requests from at least one user of the system and at least one administrator of the system into a plurality of service instructions for the processor; and
   at least one memory, comprising cryptographic data and processor executable code to perform at least one cryptographic service, wherein the cryptographic data comprises a certificate and the at least one cryptographic service comprises revoking the certificate when the certificate does not meet a requirement,
   wherein the computer processor is configured, in response to the plurality of service instructions, to cause the executable code in the at least one memory to be executed to perform the at least one cryptographic service using the cryptographic data so as to provide the at least one cryptographic service to the at least one user of the system and to the at least one administrator of the system.

2. The system of claim 1, wherein the at least one cryptographic service further comprises performing a health check on cryptographic infrastructure that generates a report comprising data on device and interface availability and performance.

3. The system of claim 1, wherein the at least one cryptographic service further comprises scanning a certificate configuration of the cryptographic data to ensure the cryptographic data meets the requirement.

4. The system of claim 1, wherein the at least one cryptographic service further comprises generating a report that includes certificate expiration data associated with the cryptographic data.

5. The system of claim 1, wherein the at least one cryptographic service further comprises logging all user or administrator activity pertaining to the cryptographic data.

6. The system of claim 1, wherein the at least one cryptographic service comprises notifying at least one of the at least one user of an impending expiration of the certificate.

7. A non-transitory, tangible computer-readable medium, storing machine readable instructions that when executed by a processor cause the processor to:
   receive a plurality of cryptographic service instructions from at least one interface in response to a plurality of cryptographic services requests from at least one user of a cryptographic services system and at least one administrator of the cryptographic services system, the at least one interface including at least one network interface;
   retrieve processor executable code and cryptographic data from at least one memory, wherein the cryptographic data comprises a certificate; and
   execute the processor executable code to perform at least one cryptographic service, corresponding to the plurality of cryptographic service instructions, on the cryptographic data so as to provide the at least one cryptographic service to the at least one user of the cryptographic services system and to the at least one administrator of the cryptographic services system, wherein the at least one cryptographic service comprises revoking the certificate when the certificate does not meet a requirement.

8. The medium of claim 7, wherein the at least one cryptographic service further comprises performing a health check on cryptographic infrastructure that generates a report comprising data on device and interface availability and performance.

9. The medium of claim 7, wherein the at least one cryptographic service further comprises scanning a certificate configuration of the cryptographic data to ensure the cryptographic data meets the requirement.

10. The medium of claim 7, wherein the at least one cryptographic service further comprises generating a report that includes certificate expiration data associated with the cryptographic data.

11. The medium of claim 7, wherein the at least one cryptographic service further comprises logging all user or administrator activity pertaining to the cryptographic data.

12. The medium of claim 7, wherein the at least one cryptographic service comprises notifying at least one of the at least one user of an impending expiration of the certificate.

13. A computer implemented method, executed with a computer processor, to perform at least one cryptographic service, comprising:
   receiving, with the computer processor, a plurality of cryptographic service instructions from at least one interface in response to a plurality of cryptographic services requests from at least one user of a cryptographic services system and at least one administrator of the cryptographic services system, the at least one interface including at least one network interface;
   retrieving, with the computer processor, processor executable code and cryptographic data from at least one memory, the cryptographic data comprising a certificate; and
   executing, in the computer processor, the processor executable code to perform the at least one cryptographic service, corresponding to the plurality of cryptographic service instructions, on the cryptographic data so as to provide the at least one cryptographic service to the at least one user of the cryptographic services system and to the at least one administrator of the cryptographic services system, the at least one cryptographic service comprising revoking the certificate when the certificate does not meet a requirement.

14. The method of claim 13, wherein the at least one cryptographic service further comprises performing a health check on cryptographic infrastructure that generates a report comprising data on device and interface availability and performance.

15. The method of claim 13, wherein the at least one cryptographic service further comprises scanning a certificate configuration of the cryptographic data to ensure the cryptographic data meets the requirement.

16. The method of claim 13, wherein the at least one cryptographic service further comprises generating a report that includes certificate expiration data associated with the cryptographic data.

17. The method of claim 13, wherein the at least one cryptographic service further comprises logging all user or administrator activity pertaining to the cryptographic data.

* * * * *